(12) United States Patent
Erisman

(10) Patent No.: US 6,493,398 B1
(45) Date of Patent: Dec. 10, 2002

(54) BURST MODE DIGITAL COMMUNICATIONS SYSTEM

(76) Inventor: David E. Erisman, 312 Winter Quarters, Pocomoke City, MD (US) 21651

( * ) Notice: Subject to any disclaimer, the term of this patent is extended or adjusted under 35 U.S.C. 154(b) by 0 days.

(21) Appl. No.: 09/236,669

(22) Filed: Jan. 26, 1999

Related U.S. Application Data

(63) Continuation-in-part of application No. 08/726,785, filed on Oct. 7, 1996, now Pat. No. 5,864,585.

(51) Int. Cl.$^7$ ............................................... H04L 27/12
(52) U.S. Cl. ....................................... 375/295; 375/324
(58) Field of Search ................................ 375/302, 308, 375/300, 268, 269, 271, 279, 280

(56) References Cited

U.S. PATENT DOCUMENTS

| | | | |
|---|---|---|---|
| 3,713,136 A | 1/1973 | Nagy, Jr. ..................... | 341/118 |
| 3,980,826 A | 9/1976 | Widmer ....................... | 375/258 |
| 4,395,642 A | 7/1983 | Traub .......................... | 327/129 |
| 4,435,824 A | 3/1984 | Dellande et al. ............. | 375/273 |
| 4,472,747 A | 9/1984 | Schwartz ...................... | 360/32 |
| 4,564,823 A | 1/1986 | Stahler ......................... | 332/120 |
| 4,596,022 A | 6/1986 | Stoner ......................... | 375/272 |
| 4,745,628 A | 5/1988 | McDavid et al. ............ | 375/261 |
| 4,809,205 A | 2/1989 | Freeman ...................... | 364/721 |
| 4,871,987 A | 10/1989 | Kawase ....................... | 332/100 |
| 4,897,620 A | 1/1990 | Paradise ...................... | 332/100 |
| 4,905,177 A | 2/1990 | Weaver, Jr. et al. ......... | 364/721 |
| 4,975,699 A | 12/1990 | Frey .............................. | 341/118 |
| 4,995,059 A | 2/1991 | Ishikawa ..................... | 375/245 |
| 5,012,491 A | 4/1991 | Iwasaki ....................... | 375/343 |
| 5,046,071 A | 9/1991 | Tanoi .......................... | 375/245 |
| 5,103,463 A * | 4/1992 | Schoeneberg ............... | 329/315 |
| 5,237,324 A | 8/1993 | Linz et al. ................... | 341/147 |
| 5,357,544 A | 10/1994 | Horner et al. ............... | 375/340 |
| 5,361,046 A | 11/1994 | Kaewell, Jr. et al. ........ | 332/100 |
| 5,406,071 A | 4/1995 | Erisman ...................... | 375/272 |
| 5,430,764 A | 7/1995 | Chren, Jr. .................... | 375/308 |
| 5,467,294 A | 11/1995 | Hu et al. ...................... | 364/721 |
| 5,479,168 A | 12/1995 | Johnson et al. ............. | 341/110 |
| 5,479,451 A | 12/1995 | Eldering et al. ............. | 375/343 |
| 5,481,230 A | 1/1996 | Chang et al. ................ | 332/112 |
| 5,513,219 A | 4/1996 | Ham ............................ | 375/272 |
| 5,621,766 A | 4/1997 | Bakke et al. ................ | 375/340 |
| 5,642,386 A | 6/1997 | Rocco, Jr. .................... | 375/355 |

* cited by examiner

Primary Examiner—Stephen Chin
Assistant Examiner—Kevin Kim
(74) Attorney, Agent, or Firm—Richard C. Litman

(57) ABSTRACT

A burst mode digital communications system which is unique in that it modulates a sinusoidal carrier with discrete cosine segments. The discrete cosine segments may contain different time and amplitude values. The discrete cosine segments may be combined with each other or with zero slope level segments in order to effectively modulate the sinusoidal carrier. Rather than employing the use of filters for controlling instantaneous voltage changes, the present communications system forces the bit edges of the discrete cosine segments to occur at the zero slope points of a cosine wave, where no voltage changes occur. The communications system utilizes direct digital synthesis in order to create a carrier signal which closely represents sinusoidal carrier signal. The present communication system may be used in conjunction with various conventional methods such as phase-shift keying and amplitude-shift keying. A device is also disclosed for demodulating the carrier signal in order to recover the original base band signal. The burst mode digital communications system may also demodulate data by employing adaptive templates for more accurately determining received digital symbols.

35 Claims, 30 Drawing Sheets

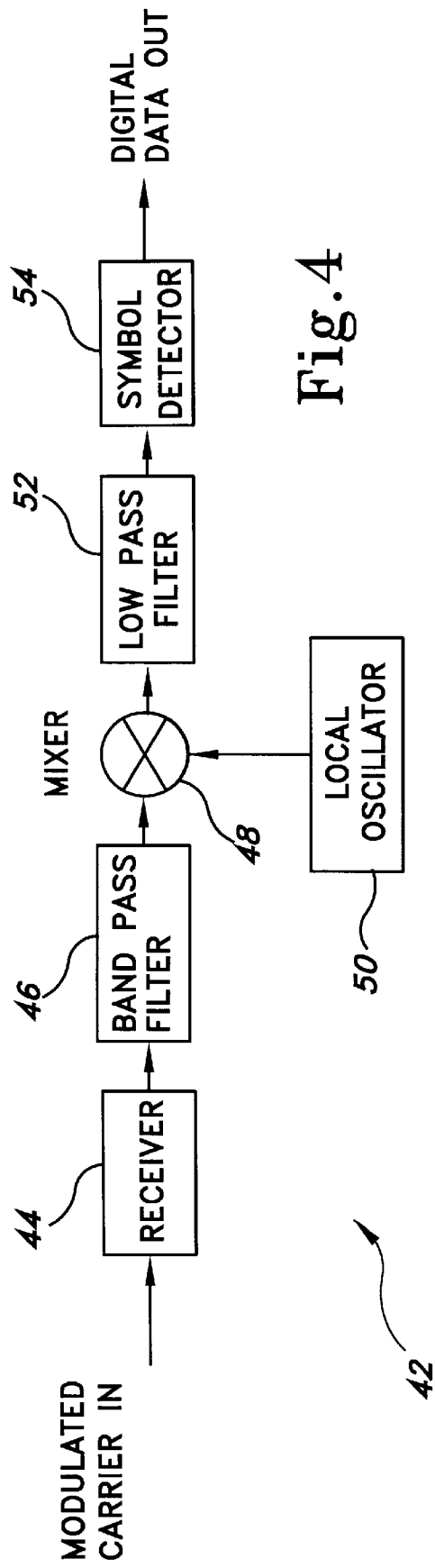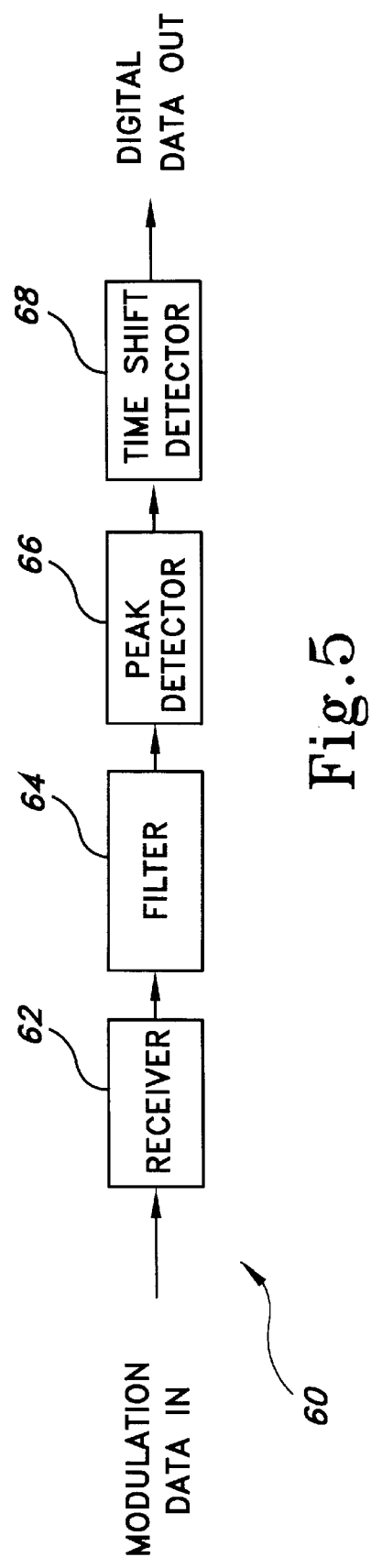

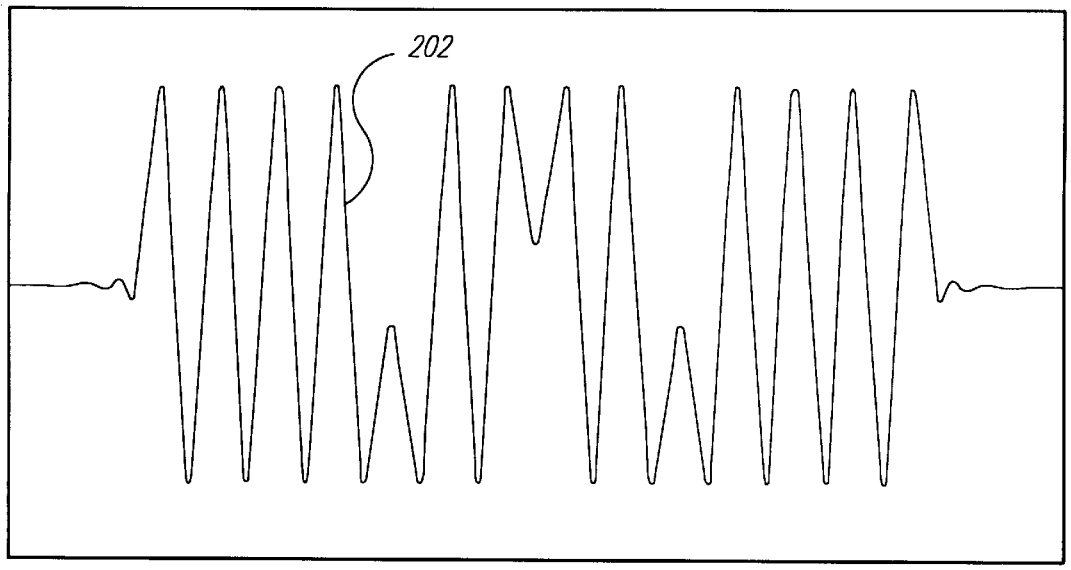
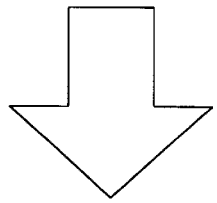
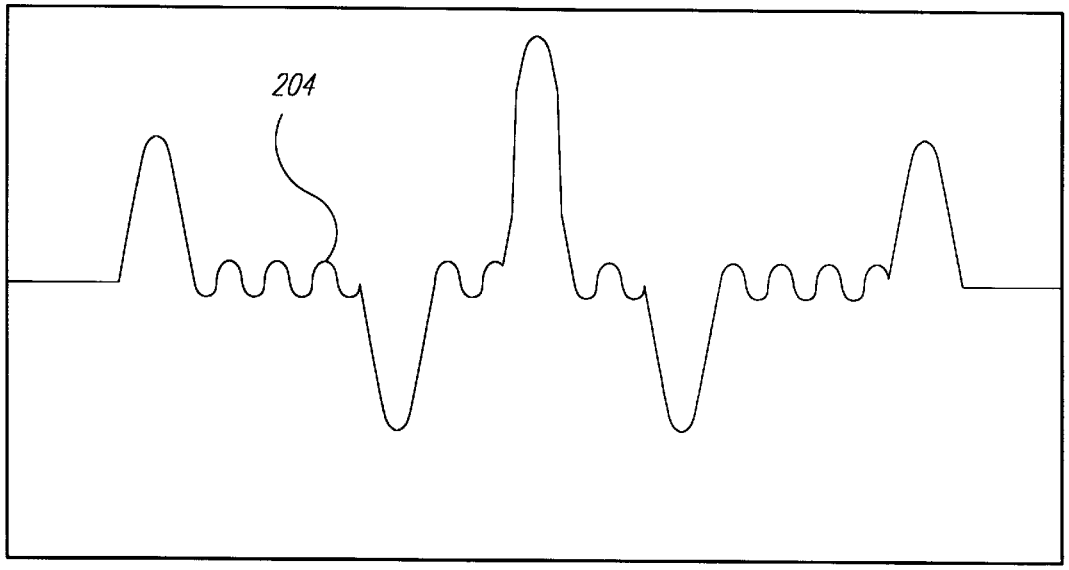
Fig.42 (PRIOR ART)

BURST MODE DIGITAL COMMUNICATIONS SYSTEM

CROSS REFERENCE TO RELATED APPLICATIONS

This is a continuation-in-part of application Ser. No. 08/726,785 filed on Oct. 7, 1996, now U.S. Pat. No. 5,864,585.

BACKGROUND OF THE INVENTION

1. Field of the Invention

The present invention relates to digital communications systems in which the carrier signal is varied in accordance with bursts of binary data being transmitted. More particularly, the present invention pertains to a burst mode data communications technique in which the carrier signal is optimized for bit synchronization and immunity to impairments arising from signal multi-path, in wireless applications, and reflections, due to impedance discontinuities in wire line applications.

2. Description of the Related Art

Digital modulation is the means by which a carrier, inherently, analog in nature, is made to carry digital information in a communications channel. This involves altering the amplitude of the carrier, the angular velocity of the carrier, or both. The objective is to create discrete phase/amplitude states in a manner that leaves little chance for ambiguity between the states. These discrete states, commonly designated as symbol states, correspond, to one or more binary bits of data. By regenerating the binary data at intervals along a transmission path, re-transmitting data that is determined to be corrupt and applying error correction, digital data can be transmitted over great distances with no degradation of quality, even in the presence of a significant level of background noise. This is in stark contrast to analog modulation in which noise effects accumulate through the transmission path, usually without remedy.

In digital communications channels, noise is only one problem which must be overcome. In wire line applications impairments in cables cause impedance discontinuities, whereby resultant distortion of the signal and recovery of the digital data at the receiver becomes much more difficult. In wireless applications, multi-path is a degrading factor, especially with antennas of low, directivity. The transmitted signal traverses the most direct and desirable path to the receiving antenna. However, the signal may traverse an indirect path as well, being reflected from a buildings or other object, and also arrive at the receiving antenna. Multi-path causes a summation of such reflected signals, delayed in time, with the main signal. This also makes recovery of the digital data more difficult.

The prior art uses techniques such as training sequences, which allow equalization to be gradually varied until the equalization settings are optimized. This approach works well with continuous data streams that last for seconds or more, but does not work very well for burst mode transmissions, which may originate from multiple points. The transmitter in this case bursts out data for short periods of time and then becomes quiet to allow other transmitters a chance to send data. For efficient use of the channel, each burst of data normally contains a preamble or header which is used for synchronization and for setting the receiver voltage thresholds. Then the payload data is sent followed by a trailer to gracefully end the transmission.

When channel impairments are present, the preamble is not always lengthy enough to allow an equalizer to train effectively. Each transmitter has its own unique path to a receiver, and associated impairments, which means the equalizer must be prepared to train on every burst or packet sequence of data. If additional header data and training time is allowed for data recovery, the effective data throughput can go down considerably. Some training sequences last for more than a second, which could translate into millions of throw away header bits at the beginning of every data burst. This is clearly undesirable when the goal is to get the maximum utilization of a communications channel.

Carrier signals for digital modulation are typically based on sinusoidal waveforms because such waveforms require the least amount of bandwidth. There exists three classical forms of digital sinusoidal modulation: amplitude shift keying (ASK), frequency shift keying (FSK), and phase shift keying (PSK). Improvements have been made in digital sinusoidal modulation, however all of the improvements have been based on the three classical techniques previously mentioned. In ASK, the amplitude of the carrier signal is varied or shifted in response to changes in the digital data. In FSK, the frequency of the carrier signal is varied or shifted in response to changes in the digital data. In PSK, the phase of the carrier signal is varied or shifted in response to changes in the digital data.

There are also certain disadvantages associated with the classical modulation techniques. For example, ASK is especially susceptible to atmospheric noise and fading. FSK requires that an associated receiver detect two discrete frequencies before the frequency can be acquired and detected. This presents delays due to the additional time required to receive the several cycles of each frequency. PSK requires complex receiver circuitry in order to detect phase changes. Furthermore, elaborate filtering is necessary to control spurious outputs resulting from the discontinuities associated with the phase changes.

One disadvantage, however, is common to all of the classical modulation techniques and their derivative improvements. This is the use of fixed time slots for varying the characteristics of the carrier signal. When fixed time slots are used, variations in the carrier signal occur at random points along the sinusoidal waveform, thus resulting in spurious frequencies and expanding of the modulation bandwidth. Complex filtering becomes necessary in order to reduce the amplitude of these spurious frequencies. As the bit rate increases, the variations in the carrier signal occur more frequently, thus posing a challenging demodulation task.

It is well known that the amount of spurious output generated by the variation of a sinusoidal waveform is dependant upon the instantaneous value of the slope of the waveform when the changer occurs. Thus, a change which occurs at exactly the midpoint or highest kinetic energy point of the waveform generates the greatest amount of spurious output because the slope value is at its maximum. If the change occurs at exactly the peak of the waveform however, the least amount of spurious output is generated because the slope value is at its minimum, i.e., zero kinetic energy.

Representation of discrete states of digital data is accomplished through various base band encoding techniques. FIG. 2A illustrates various known base band encoding techniques. In non-return to zero level (NRZ-Level) encoding 28, digital code is produced by instantaneously shifting voltage levels at fixed bit time intervals so that two unique binary symbols are represented, a one and a zero. Thus, a one is represented by one level, while a zero is represented by the other level. The NRZ-Mark digital code 30 is produced by instantaneously shifting voltage levels at fixed bit intervals only when a one is transmitted and not changing levels when a zero is transmitted. The RZ digital code 32 is produced by instantaneously shifting voltage levels at half bit-time intervals when a one is transmitted and not changing levels when a zero is transmitted. A BI-PHASE-Level digital code 34 is produced by instantaneously shifting voltage levels at half bit-time intervals so that a one is a high level during the first half of the bit time and a zero is a high level during the second half of the bit time. The NRZ-4Level digital code 36 is produced by shifting voltage levels instantaneously after two, bit-time intervals. A one--one is transmitted by the top level, a one-zero is transmitted by the next lower level, a zero-one is transmitted by the next lower level, and a zero-zero is transmitted by the bottom level. By encoding two bit times into one symbol, NRZ-4Level encoding reduces the effective transitioning rate in half. Similarly, three bit times could be encoded into NRZ-8Level encoding to reduce the transitioning rate by one third. Multi-level encoding suffers from a drawback in that it necessitates a more complex receiver to detect and recover the transmitted symbol.

The prior art creates transitions at fixed bit times when encoding digital symbols. These transitions occur at the bit edges and remain steady until the next bit edge, thus requiring the transmission of a step function or rectangular pulse. The rectangular pulse or step function generates spurious energy components at frequencies from zero to infinity. Consequently, frequency multiplexing of data over a communications channel cannot be performed unless the instantaneous voltage transitions of the rectangular pulse are filtered to remove unwanted energy components throughout the frequency spectrum. The rectangular pulse and its corresponding bandwidth are shown in FIG. 3.

As an example, consider data transmitted at 1000 bits/ second. The bit time T would be 1/1000 of a second, or 1 millisecond. The first frequency null would occur at 1/T or 1000 Hz and energy components would extend from zero hertz to infinity. When the rectangular pulse is used to modulate a sinusoidal carrier, the negative frequency spectrum would also be translated up in frequency and the null to null bandwidth would be 2/T or 2000 Hz. However, energy outside of the main lobe is not required to recover the transmitted data. Furthermore, it is desirable to reduce the modulation bandwidth by eliminating frequency energy outside this primary lobe.

In order to transmit the maximum amount of data over a given digital communications channel, a small bandwidth and high bit rates are required. For example, more data can be transmitted over a frequency multiplexed communications channel, such as those used in satellite links, when data communication techniques are used that have narrow bandwidth requirements per carrier signal whiled still providing high data rates.

Much development work has gone into ways of minimizing the bandwidth of the rectangular pulse. In the prior art, the instantaneous transitions at the bit edges are smoothed by passing the rectangular pulse through filters. While the filtering process removes many of the unwanted frequencies outside of the main modulation lobe, it also removes some of the energy which helps in the symbol recovery process. Thus, a delicate balancing act must be made in choosing a filter suitable for reducing the bandwidth while not seriously degrading the modulation information contained within the symbol. It has been shown by Nyquist and others that the band limited rectangular pulse has an ideal shape after filtering which is called the sin x/x or sinc pulse.

A filtered rectangular pulse which closely approximates the ideal sinc pulse shape is commonly used to modulate a high frequency sinusoidal carrier, thus producing an upconverted frequency multiplexed communications channel which can transmit numerous messages simultaneously. Each digitally encoded base band signal is subsequently modulated with a carefully chosen local oscillator frequency in order to pack the greatest number of carrier signals within a given communications channel.

Recovery of individual carrier signals is accomplished through the use of a carefully created local oscillator capable of downconverting the carrier signal to the original digitally encoded base band signal. Due to the pulse filtering during the modulation process, the received base band signal has an "eye pattern" associated with it. This eye pattern is the result of the vertical edges of the rectangular pulse being filtered and the shape of the "eye" opening is based on the sinc pulse shape.

Conventional demodulation of the data in the two symbol case is accomplished by using a zero voltage reference. A measurement is made at the center of the bit time in order to determine whether the received symbol is above or below this zero voltage level. It is important to base the decision of which bit was received precisely at the midpoint of the bit time because the least amount of ambiguity exists between symbols at the midpoint of the bit time. Furthermore, the decision of which symbol is received is complicated by interference and noise that is present to some degree in all communications channels. The interference and noise causes the eye opening to close, thus making it critical to choose the optimum point for symbol decision making.

Further reductions in the bandwidth can be gained when more than two symbols are utilized. The number of symbols increases as a power of 2. For example, 2, 4, 8, 16, 32, 64, 128, 256, 512, and 1024 symbols are used in modern communications systems. To achieve a large number of unique and distinctive symbols, changes in carrier phase and amplitude are typically used. To go from 2 to 4 symbols gives a reduction of 2 in bandwidth. Eight symbols reduce bandwidth by one third, sixteen symbols reduces bandwidth by one fourth and so on. The penalty for increasing the number of symbols is the increased difficulty in determining which symbol was actually received.

When the binary case of two symbols is used, there is only one voltage reference needed to determine if the eye pattern is above or below the reference. However, when many symbols are used to reduce bandwidth, a corresponding increase in symbol amplitude and phase references are needed. This is further complicated by thee fact that interference and noise are always present in the channel, resulting in a greater possibility of making an incorrect symbol decision when an increased number of symbols are used.

The related art is represented by the following patents of interest.

U.S. Pat. No. 3,713,136, issued on Jan. 23, 1973 to John Nagy, Jr., describes an analog-to-digital converter of the dual slope integrating type that operates without counter reset or input gating circuitry to provide successive, accurate digital readouts representing the average magnitude of corresponding analog input signals. Nagy, Jr. does not suggest a burst mode digital communications system in accordance with the claimed invention.

U.S. Pat. No. 3,980,826, issued on Sep. 14, 1976 to Albert X. Widmer, describes a bifrequency encoded binary data transmission system wherein the transmitted signal is predistorted to eliminate the need for equalization at the receiving end. Widmer does not suggest a burst mode digital communications system in accordance with the claimed invention.

U.S. Pat. No. 4,395,642, issued on Jul. 26, 1983 to Stefan Traub, describes a sine-shaping circuit which is capable of generating a sinusoidal signal having low harmonic distortion, continuous slope and high accuracy. Traub does not suggest a burst mode digital communications system in accordance with the claimed invention.

U.S. Pat. No. 4,435,824, issued on Mar. 6, 1984 to Brian W. Dellande et al., describes a communications system which generates an output signal of a selected primary frequency having digital data bits serially modulated thereon. The system utilizes a hybrid differential phase-shift keyed (DPSK) modulation. The improved DPSK modulation is frequency modulation of a phase encoded signal. A controller is used to control a frequency generator means which is used to shift the frequency of the output signal between primary and secondary frequencies. The controller and frequency generator means provide a modulated output signal which is D.C. balanced bit by bit and has substantially reduced harmonic energy. Dellande et al. do not suggest a burst mode digital communications system according to the claimed invention.

U.S. Pat. No. 4,472,747, issued on Sep. 18, 1984 to David M. Schwartz, describes a microcomputer system for converting an analog input signal into a digital form for storing in digital form in a highly condensed code and for reconstructing the analog signal from the coded digital form. Schwartz does not suggest a burst mode digital communications system in accordance with the claimed invention.

U.S. Pat. No. 4,564,823, issued on Jan. 14, 1986 to John P. Stahler, describes a modulation system wherein a carrier signal is modulated by an input signal having a variable amplitude. The amplitude of the input signal is sampled every predetermined fractional cycle of the modulated signal. The carrier signal is modulated in response to the sampled amplitude of the input signal. This provides a modulated signal having an amplitude and duration which are inversely proportional to each other, but related to the sampled amplitude of the input signal, for each predetermined fractional cycle. The signal is subsequently demodulated by zero-crossing detection, peak-amplitude detection, or a combination of both. The system is self-clocking, does not produce discontinuous phase or amplitude changes, and does not introduce DC components. Stahler does not suggest a burst mode digital communications system according to the claimed invention.

U.S. Pat. No. 4,596,022, issued on Jun. 17, 1986 to Donald L. Stoner, describes a system for communicating digital data over a limited bandwidth transmission link. The system utilizes modulator means for receiving an input digital signal and generating a corresponding frequency shift keyed signal having high-frequency and low-frequency signals with in-phase signal transitions at frequency shifts. Demodulator means are provided for receiving-and demodulating the frequency shift signal in order to generate an output digital signal corresponding to the input digital signal. The demodulator means includes a zero crossing detector in order to recover the frequency shift keyed signal received. The system includes a transition detector for detecting transitions in the binary logic state on an input digital signal and generating a transition indicator signal in response thereto. A frequency shift key having an oscillator capable of generating high and low frequency signals is used to provide substantially in-phase signal shifts. Stoner does not suggest a burst mode digital communications system according to the claimed invention.

U.S. Pat. No. 4,745,628, issued on May 17, 1988 to William T. McDavid et al., describes a symbol generator for phase. modulated systems. The symbol modulator produces a filtered analog waveform for use in phase modulating a carrier. The symbol generator includes a memory for storing digital representations of analog waveform segments at predetermined addressable locations. Each segment corresponds to the cross-correlation of a predetermined filter function with a predetermined number of data bits in the data stream. The data stream is converted to an address for the memory to output a digital value to a digital to analog converter. The output of the digital to analog converter includes an in-phase and quadrature-phase components which are directed to a sample and hold circuit for generating the analog signals. The waveform segments are then sequentially assembled and directed to a vector modulator. McDavid et al. do not suggest a burst mode digital communications system according to the claimed invention.

U.S. Pat. No. 4,809,205, issued on Feb. 28, 1989 to Richard A. Freeman, describes a direct digital synthesizer which digitally generates a sinusoidal waveform by dividing the sine waves into a plurality of coarse phase angle intervals, which are in turn divided into a plurality of intermediate phase angle intervals. Freeman does not suggest a burst mode digital communications system in accordance with the claimed invention.

U.S. Pat. No. 4,871,987, issued on Oct. 3, 1989 to Seiji Kawase, describes a binary signal modulator having a circuitry for sampling a binary signal at a predetermined sampling frequency. A modulating circuit responsive to the sampled binary signal is used for generating a modulated signal whose rising and decaying timings are respectively determined by the start end times of the binary signal. The rising and decaying timings of the modulated signal are defined as predetermined functions. Kawase does not suggest a burst mode digital communications system according to the claimed invention.

U.S. Pat. No. 4,897,620, issued on Jan. 30, 1990 to Ronald Y. Paradise, describes a continuous phase shift modulation system with improved spectrum control. The inventive method includes the step of determining, in advance, whether successive pulses are to have the same or different polarities for each of the in-phase and quadrature components. If successive components are to have the same polarity, then a continuous transition modulation signal between the successive pulses is provided in place of adjacent portions of the successive half-cosine pulses. The modulation of the other component is adjusted during the time of the continuous modulation signal so as to maintain a desirable constant amplitude characteristic. Paradise does not suggest a burst mode digital communications system according to the claimed invention.

U.S. Pat. No. 4,905,177, issued on Feb. 27, 1990 to Lindsay A. Weaver, Jr. et al., describes a method and apparatus for converting phase data into amplitude data. Weaver, Jr. et al. do not suggest a burst mode digital communications system in accordance with the claimed invention.

U.S. Pat. No. 4,975,699, issued on Dec. 4, 1990 to Gary D. Frey, describes a circuit for generating an analog sine voltage from a digital phase input employing a memory storing sine and cosine values and a correction value for each phase and first and second digital-to-analog converters. Frey does not suggest a burst mode digital communications system in accordance with the claimed invention.

U.S. Pat. No. 4,995,059, issued on Feb. 19, 1991 to Hisashi Ishikawa, describes a predictive coding device with an input terminal through which a sampled value is input, a predicting circuit for outputting a predicted value for the sampled value which has been input through the input terminal, and a look-up table arranged to receive, as a readout address, the sampled value input through the input terminal and the predicted value and then to output a predictive coded value. Ishikawa does not suggest a burst mode digital communications system in accordance with the claimed invention.

U.S. Pat. No. 5,012,491, issued on Apr. 30, 1991 to Motoya Iwasaki, describes a burst mode digital communications system with a preamble detection circuit that requires a small amount of preamble information for establishing carrier and clock timing and controlling preamplifier gain by deriving error control signals simultaneously during the reception of a preamble. Iwasaki does not suggest a burst mode digital communications system in accordance with the claimed invention.

U.S. Pat. No. 5,046,071, issued on Sep. 3, 1991 to Toshiyuki Tanoi, describes an encoding device for transforming a sequence of digital image signals into a sequence of transformed signals which is subjected to interframe predictive coding by the use of a subtractor and a local decoding loop. Tanoi does not suggest a burst mode digital communications system in accordance with the claimed invention.

U.S. Pat. No. 5,237,324, issued on Aug. 17, 1993 to Alfredo R. Linz et al., describes a system for producing al modulation baseband analog signal responsive to serial bits of digital data. Linz et al. do not suggest a burst mode digital communications system in accordance with the claimed invention.

U.S. Pat. No. 5,357,544, issued on Oct. 18, 1994 to Thomas G. Horner et al., describes a method of decoding a composite signal which includes receiving a composite signal including a pilot signal at a pilot signal frequency and first and second information modulated with a subcarrier at a harmonic of the pilot frequency. Horner et al. do not suggest a burst mode digital communications system in accordance with the claimed invention.

U.S. Pat. No. 5,361,046, issued on Nov. 1, 1994 to John D. Kaewell, Jr. et al., describes a modulator capable of providing a fractional sample or symbol time. The modulator employs a decimation counter responsive to a clock having a frequency of M/N*symbol clock, where M is an interpolation factor and N is a decimation factor. The modulator uses this frequency to generate a data symbol clock to select frequency shift key (FSK) symbols from a sampled data array. A multiplier receives and multiplies the FSK symbols by a weighing factor which is determined by the decimation counter. The modulator allows digital modulations which consist of a non-integer number of samples per symbol time to be synthesized in an efficient manner. The modulator is also capable of producing fractional sample and symbol modulations in order to allow support of modulations with various symbol rates by hardware platforms which contain fixed digital to analog sampling clocks. Kaewell, Jr. et al. do not suggest a burst mode digital communications system according to the claimed invention.

U.S. Pat. No. 5,406,584, issued on Apr. 11, 1995 to David Erisman, describes a time shift keying digital communications system. The system utilizes a digital modulation technique which is unique in that fixed time slots are not used to vary the characteristics of the carrier signal. Instead, variations in the time slots are used to transfer the digital information. The modulation is created by synthesizing a carrier waveform capable of varying the time it takes for each peak to occur. The peaks of the carrier signal are tightly controlled to occur at exact discrete time slots corresponding to the base band digital signal. Erisman does not suggest a burst mode digital communications system according to the claimed invention.

U.S. Pat. No. 5,430,764, issued on Jul. 4, 1995 to William A. Chren, Jr., describes a direct digital frequency synthesizer that employs residue number system based processors to generate output waveforms of desired frequencies. Chren, Jr. does not suggest a burst mode digital communications system in accordance with the claimed invention.

U.S. Pat. No. 5,467,294, issued on Nov. 14, 1995 to Vince Hu et al., describes a method and apparatus suitable for generating programmable digital sine waves which involves converting the output of a direct digital synthesizer or numerically controlled digital oscillator to a higher frequency with a multiplier-less structure that takes advantage of the. properties of trigonometric identifiers for sine and cosine. Hu et al. do not suggest a burst mode digital communications system in accordance with the claimed invention.

U.S. Pat. No. 5,479,168, issued on Dec. 26, 1995 to Keith O. Johnson et al., describes digital encoding/decoding methods and apparatus for ultra low distortion reproduction of analog signals which are also compatible with industry standardized signal playback apparatus. Johnson et al. do not suggest a burst mode digital communications system in accordance with the claimed invention.

U.S. Pat. No. 5,479,451, issued on Dec. 26, 1995 to Charles Eldering et al., describes a method for data recovery in burst mode communications systems that include a data signal having a burst preamble with a defined sequence of m bits, by sampling in a first sampling step the burst preamble with n samples per bit carried out by n bit clocks with different phases, and providing a sampled burst preamble. Eldering et al. do not suggest a burst mode digital communications system in accordance with the claimed invention.

U.S. Pat. No. 5,481,230, issued on Jan. 2, 1996 to Paul Chang et al., describes a phase modulator circuit and a method for generating an output signal having individually positionable edges. The phase modulator includes a programmable pulse generator for producing an output signal and a control value source for delivering a sequence of control values to the generator. The control values determine the time between successive output pulses. Succeeding control values are provided in response to the edges of the output signal and each next control value in the sequence is made available to the programmable pulse generator within the time between successive edges of the output. Chang et al. do not suggest a burst mode digital communications system according to the claimed invention.

U.S. Pat. No. 5,513,219, issued on Apr. 30, 1996 to Ronald E. Ham, describes a method and apparatus for transmitting information at a high rate by using an undermodulated frequency shift keyed signal. The transmission rate is independent of the data content and the system requires no zero crossing detectors. The apparatus also includes a demodulator which combines non-linear processing circuitry with a conventional demodulator. Ham does not suggest a burst mode digital communications system according to the claimed invention.

U.S. Pat. No. 5,621,766, issued on Apr. 15, 1997 to Bradley B. Bakke et al., describes a signal receiver using a burst detector to detect the occurrence of a burst. Bakke et al. do not suggest a burst mode digital communications system in accordance with the claimed invention.

U.S. Pat. No. 5,642,386, issued on Jun. 24, 1997 to A. Gregory Rocco, Jr., describes an all-digital data sampling circuit and related sampling method for a burst mode data communications system. Rocco, Jr. does not suggest a burst mode digital communications system in accordance with the claimed invention.

None of the above inventions and patents, taken either singularly or in combination, is seen to describe the instant invention as claimed.

SUMMARY OF THE INVENTION

The present invention is a burst mode digital communications system which provides a method for digitally modulating a sinusoidal carrier. The method utilizes direct digital synthesis techniques to create discrete carrier segments having zero slope edges. The discrete carrier segments may contain different time, phase, or amplitude values and can be combined with other discrete carrier segments having zero slope edges or zero slope level segments to modulate the sinusoidal carrier. A table of phase amplitude values is first created using direct digital synthesis, techniques and subsequently stored in a read only memory (ROM) look-up table. A plurality of digital data blocks are then sent to an associated transmitter and modulated. The modulation is performed such that the bit edges of each of the digital data blocks occur at zero slope points where no voltage step changes take place. The stored phase amplitude values for each digital data block are then passed through a digital-to-analog converter, thereby producing an analog waveform. A microprocessor and a phase accumulator may be utilized to accurately control reception and, modulation of the digital data blocks. In preferred embodiments off the invention, the output of the digital-to-analog converter may be filtered in order to remove sampling artifacts and produce a low distortion waveform.

The present invention also provides a method for demodulating data which has been modulated by discrete carrier segments having zero slope edges. The data received is in the form of a carrier signal which is composed of carrier segments. The carrier segments are filtered in order to remove unwanted noise. The carrier segments of the modulated data may then be recovered by detecting the presence or absence of the carrier segments within a predetermined bit time or symbol duration. In preferred embodiments of the invention, the frequency of the carrier symbol is downconverted to the lowest possible value and filtered.

The present invention also provides a carrier segment communications system which includes means for receiving a plurality of digital data blocks. The digital data blocks are received in a sequential manner. Furthermore, each digital data block has a discrete value associated therewith which is selected from a predetermined number of possibly assigned discrete values. In certain preferred embodiments of the invention, the predetermined number of possibly assigned discrete values is two Thus, each block of digital data is a binary digit. The system also includes means for modulating the data blocks in order to construct a carrier signal having carrier segments of predetermined shapes. The predetermined shapes are selected from a predetermined set of shapes consisting of cosine segments, sine segments, zero slope level segments, and combinations thereof. The edges of each carrier segment have a slope equal to zero. In preferred embodiments of the invention, the carrier segments are pi radians in length, so that they begin at a zero slope point and terminate at a zero slope point.

The system monitors the completion of each successive carrier segment being used to construct the carrier signal and a controller produces a control signal which indicates the correct carrier segment to be used. The controller accomplishes this task by examining the discrete value associated with the incoming digital data blocks and determining which carrier segment is representative of the digital data block being examined. It is preferred that the system further include means for transmitting the resulting carrier signal to a remote location. Furthermore, the remote location should be capable of receiving the carrier signal and demodulating it so that the base band digital signal is recovered.

When a digital signal is summed with a delayed version of itself as would happen in a multi-path condition, a complex waveform results from the destructive and constructive interaction of the amplitudes and phases that represent each digital symbol In the proposed burst mode communications technique of the present invention, simple sine waves are sampled, facilitating symbol bit edge synchronization in the preamble, and then special symbol combinations are sampled to enable optimum recognition of subsequent symbols. Special receiving techniques are then utilized to eliminate long training and equalization delays in order to maximize multi-point burst mode digital data communications.

At the beginning of the data burst or packet, determining the symbol bit edges is critical for proper synchronization. If the symbol bit edges are incorrectly detected, the entire packet can be lost, so the present invention utilizes specially created symbols for this purpose. After synchronization, the symbols must be detected with the least amount of ambiguity possible. The receiver detection process in the present invention utilizes the impaired symbol directly and does not require an equalizer to compensate for the effects of the impairment. This technique allows the synchronization and detection set up processes to occur in the first few bits of the packet.

Conventional techniques require a coherent phase reference local oscillator to phase lock onto the incoming carrier. This phase locked local oscillator is then heterodyned with the incoming data carrier to determine the phase and amplitude constellation used for demodulation. When impairments are present, equalization is necessary to keep the received signal constellation tightly grouped for optimum symbol recognition. Both ends of the communications link may even send training sequences to each other to further adapt to the communications link impairments. All of these conventional techniques require significant time delays, which reduce throughput and are very undesirable in burst mode communications systems.

In the proposed burst mode digital communications system, carrier segments and special symbols are initially transmitted at the beginning of the burst. These are designed to provide symbol edge synchronization which can be used for a long series of data symbols to follow. The amplitudes of the symbols are used as a standard from which voltage thresholds are derived. After the synchronization symbols are transmitted, the data symbols can be changed to convey the maximum amount of detectable information between digital states so as to reduce ambiguity in the detection process. This technique can be especially useful in the presence of impairments such as signal interferers, multi-path reflections, or reflections caused by non-terminated wire or cable links. When two ends of a communications link have systems based on precision high speed system clocks, the small inherent frequency differences between the two systems can be ignored if the data bursts are small or interspersed with synchronization symbols during the data bursts.

For the reception and demodulation of data symbols in the proposed system, the receiver is based on digital techniques where analog-to-digital sampling of the received waveform first takes place. These data samples are first compared against an expected pattern or template to find the symbol edge synchronization. A known transmitted sequence of special preamble symbols, digitally sampled, allows the receiver to store these samples to be used as templates, uniquely defining the pattern for each digital state Each subsequent received bit has its associated digital values compared against the stored templates to determine how many digital values matched the stored template values. The template with the highest number of matches then determines the decision as to which symbol was received. This technique is adaptive since the templates incorporate sampled digital values that already account for channel impairments. These templates are constantly updated for each data burst, which allows for increased immunity from multi-path or reflective impairments. This technique also allows very rapid acquisition of the data burst, which translates into higher data throughputs.

Accordingly, it is a principal object of the invention to provide a burst mode digital communications system which digitally creates a sinusoidal carrier by utilizing discrete carrier segments which can be added together or added with zero slope level segments.

It is another object of the invention to provide a burst mode digital communications system which digitally modulates a sinusoidal carrier using direct digital synthesis techniques to produce data symbols that are unambiguous and resistant to channel impairments.

It is yet another object of the invention to provide a burst mode digital communications system which controls the instantaneous voltage changes occurring at the bit edges without the use of filters.

It is a further object of the invention to provide a burst mode digital communications system which minimizes the amount of spurious output associated with the digital modulation of a sinusoidal carrier.

It is yet a further object of the invention to provide a burst mode digital communications system which demodulates digital data which has been modulated by carrier segments having zero slope edges.

Still another object of the invention is to provide a burst mode digital communications system which digitally demodulates the data by utilizing digital data template values captured from the incoming carrier with impairments that are compared continuously with new symbols to determine the digital symbol data.

Still a further object of the invention is to provide a burst mode digital communications system which employs a data channel with high bit rates and a narrow bandwidth that is immune to noise and signal interference.

Still a further object of the invention is to provide a burst mode digital communications system which enables multi-symbol communications using amplitude modulation in combination with frequency diversity.

It is an object of the invention to provide improved elements and arrangements thereof in a burst mode digital communications system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a block diagram of a demodulator circuit of the present invention.

FIG. 5 is a block diagram of a demodulator circuit for use with time-shift keyed data which has been modulated using the cosine segment modulation technique of the present invention.

FIG. 42 shows a single carrier digital signal transmission and a single carrier digital signal reception based on a summation of the main transmitted signal with reflected signals that result in the destructive impairment of the received signal according to the prior art.

Similar reference characters denote corresponding features consistently throughout the attached drawings.

DETAILED DESCRIPTION OF THE PREFERRED EMBODIMENTS

Figure 1:
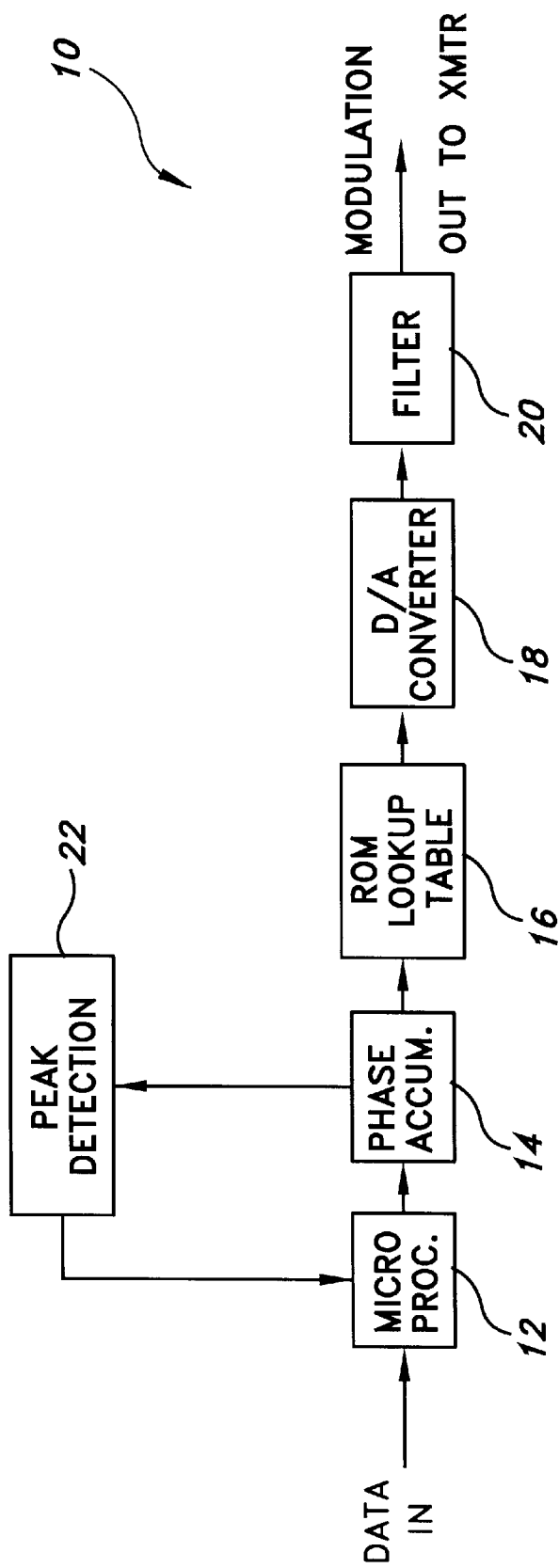
FIG. 1 is a block diagram of a modulator circuit for carrying out the carrier segment modulation technique of the present invention.

With reference to the drawings and initially to FIG. 1, there is shown a block diagram 10 of a modulation circuit for use in carrying out the cosine segment modulation technique of the present invention. The system includes means for receiving a plurality of digital data blocks, means for modulating the data blocks, and means for determining the completion of successive segments of the carrier signal being constructed.

The digital data blocks are received in a sequential manner and further include a discrete value associated therewith which is selected from a predetermined number of possibly assigned discrete values. In preferred embodiments of the invention, the predetermined number of possibly assigned discrete values is two, such that each block of digital data is representative of a binary digit. The digital data is received by a controller 12 which includes two inputs and one output. The output of the controller 12 is coupled to the means for modulating the digital data received.

The means for modulating the digital data includes a phase accumulator 14, a ROM look-up table 16, a digital-to-analog converter 18, and a peak detection circuit 22. The input of the phase accumulator 14 is directly coupled to the output of the controller 12. The phase accumulator 14 includes two outputs, one coupled to the input of the ROM look-up table 16 and another coupled to the input of the peak detection circuit 22. The output of the peak detection circuit 22 is coupled to the second input of the controller 12.

Figure 6:
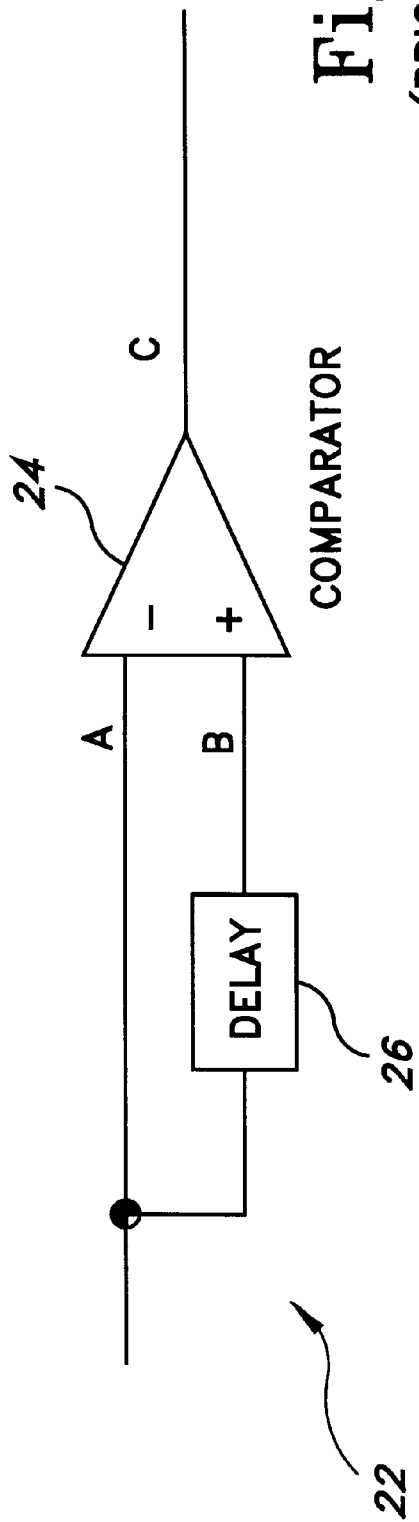
FIG. 6 is a schematic of peak detector circuitry used in the present invention.

With continued reference to FIG. 1 and particular reference to FIG. 6, the peak detection circuit 22 is seen to include an operational amplifier 24 used as a comparator circuit. The signal from the phase accumulator 14 is coupled to the inverted input of the operational amplifier. The signal from the phase accumulator 14 is also directed through a delay circuit 26 and the resulting output is coupled to the normal input of the operational amplifier 24. When the normal input of the operational amplifier 24 is greater than that of the inverted input, the output is pinned to the normal power supply voltage level. If the inverted input of the operational amplifier 24 is greater than that of the normal input, then the output is pinned to the inverted power supply voltage level. The time difference between comparator changes is examined by a time shift detector (not shown) in order to demodulate the data.

Turning back to FIG. 1, the phase accumulator 14 receives a succession of control signals from the output of the controller 12. The phase accumulator 14 then uses these control signals to generate a succession of phase address locations. The phase addresses correspond to successive addresses in the ROM look-up table 16. The addresses in the ROM look-up table 16 contain amplitude coefficients for predetermined shapes. The amplitude coefficients are subsequently directed to the input of the digital-to-analog converter 18 in order to produce an accurate sinusoidal waveform. It is also possible to direct the output of the digital-to-analog converter 18 to a filter 20 in order to remove sampling noise and interference which is outside the desired bandwidth.

The predetermined shapes stored in the ROM look-up table 16 are selected from a predetermined set of shapes consisting of cosine segments, zero slope level segments, and combinations thereof. The edges of each segment have a slope which is equal to zero. In preferred embodiments of the invention, the cosine segments are pi radians in length, so that they begin with a zero slope and terminate with a zero slope.

The system monitors the completion of each successive carrier segment being used to construct the carrier signal and the controller 12 produces a control signal which indicates the correct carrier segment to be used. The control signal is a numerical value which indicates to the phase accumulator 14 which starting and ending addresses to use in order to create the next symbol. Thus, the phase accumulator 14 will access the symbol amplitude coefficients which are sequentially located in the ROM look-up table 16 in accordance with the address values produced by the controller 12. The controller 12 accomplishes this task by examining the discrete value associated with each of the incoming digital data blocks and determining which carrier segment is representative of the current digital data block being examined. The controller 12 can detect when the zero slope points occur by monitoring the signal from the peak detection circuit 22.

The peak detection circuit 22 monitors the address signals from the phase accumulator 14 in order to detect the peaks of the sinusoidal carrier which correspond to the addresses containing the largest positive and negative phase amplitude coefficients stored within the ROM look-up table 16. Whenever the address signal indicates that the address of the positive or negative peak is being accessed from the ROM look-up table 16, the peak detection circuit 22 will then indicate to the controller 12 that the end of a carrier segment has been reached via a signal directed to the second input of the controller 12. If more than 1 pi radians is desired to be contained within the digital symbol, the number of peak detections can be used to control the number of pi radian carrier segments contained within the symbol.

When the address containing a zero slope such as a cosine peak or symbol edge is detected, the microprocessor 12 can send a new signal to the phase accumulator 14, thereby causing a new symbol table to be accessed. This is accomplished by addressing a different section of the ROM look-up table 16 or by varying the access time between each successive phase amplitude coefficient in that symbol. For a given clock cycle, the more phase amplitude coefficients in the ROM look-up table 16 to define the carrier segment, the lower the effective carrier frequency will be. Conversely, for a given number of phase amplitude coefficients representing a carrier segment, the slower the clock cycle for addressing the ROM look-up table 16, the lower the effective carrier frequency will be. Repeating the peak positive or negative phase amplitude coefficients for multiple clock times will produce zero slope segments that can provide time or phase shifts unique to that symbol.

For example, a length of time T0 may be used to indicate that a digital data block has a value of one for a carrier segment and a length of time T1 may be used to indicate that a digital data block has a value of zero. Direct digital synthesis can bemused to produce cosine segments and zero slope level segments to produce a sinusoidal carrier wave with a high degree of accuracy at frequencies only limited by clock speed and current digital, technology.

Consider the production of a bit rate of 1 Mbits/sec using 20 pi radian cosine segments, or 10 cycles per symbol, with a carrier frequency of approximately 10 MHz being utilized. The system clock of the direct digital synthesis is 100 MHz and a one is represented by 10 cycles, or 20 cosine segments, within a symbol time of 1 microsecond, while 10 cycles, or 20 cosine segments, within a symbol time of 0.95 microseconds represents a zero. There would be 100 phase amplitude coefficients accessed from the ROM look-up table 16 for every carrier segment representing a one. There would be 95 phase amplitude coefficients accessed from the ROM look-up table 16 for every carrier segment representing a zero.

If the first block of digital data is to be a one (1) followed by a zero (0), followed by another one (1), and then followed by another zero (0), then the first and third carrier segments would have 100 phase amplitude coefficients located within them, while the second and fourth carrier segments would have 95 phase amplitude coefficients located within them. The effective data rate in this case would be 1.02564 Mbits/sec and would vary somewhat depending on the data sequence being transmitted.

The controller 12 would send a signal having a first value in order to produce a symbol with 20 pi radians in 10 microseconds for the first sinusoidal carrier segment. When the peak detection circuit 22 indicates that the bit edge or symbol endpoint has arrived, the controller 12 will send a signal having a second value in order to produce a symbol with 20 pi radians in 9.5 microseconds for the second sinusoidal carrier segment. The process continues for each carrier segment, thereby producing modulation by precisely timing the creation of the carrier segments of the carrier signal.

In the binary case of cosine segment modulation where two discrete time slots would represent 1 bit of data as set forth above, the sinusoidal carrier would change its modulation parameters exactly at the zero slope point after ten cosine cycles and time would be the varied parameter. As in other forms of digital modulation, even more efficiency could be achieved by using more than two distinct carrier states. Cosine segment modulation could incorporate amplitude changes along with phase or time changes in order to provide even greater bandwidth efficiencies.

The frequency of electromagnetic waves is often measured in radians per second, where one thousand hertz is equivalent to two thousand pi radians per second. The positive peak to negative peak distance of a cosine wave is one pi radians. Thus, two pi radians would be one complete cycle, i.e. the distance from one positive peak to another positive peak or one negative peak to another negative peak. If the slope of a cosine wave is plotted, the slope would transition from zero at the signal peaks to a maximum value at the zero voltage crossing point. The higher the frequency of the cosine wave, the greater the slope value will be at the zero voltage crossing level. However, even if the frequency of the cosine wave approaches infinity, the slope values always transition to zero twice per cosine cycle.

By utilizing the special case of the cosine wave where the slope equals zero, a precisely formed digital symbol can be created that can greatly improve both the bit rate and the bandwidth required. By adding or concatenating the cosine segments together a sinusoidal carrier can be produced which smoothly transitions between discrete phase, frequency, or time values so that a very narrow bandwidth is produced and filtering requirements are greatly reduced or become unnecessary. By precisely matching the zero slope points of the cosine segments of the carrier to the rectangular edges that define a bit time, both the bit rate and the bandwidth can be greatly improved over conventional modulation techniques.

Figure 2A:
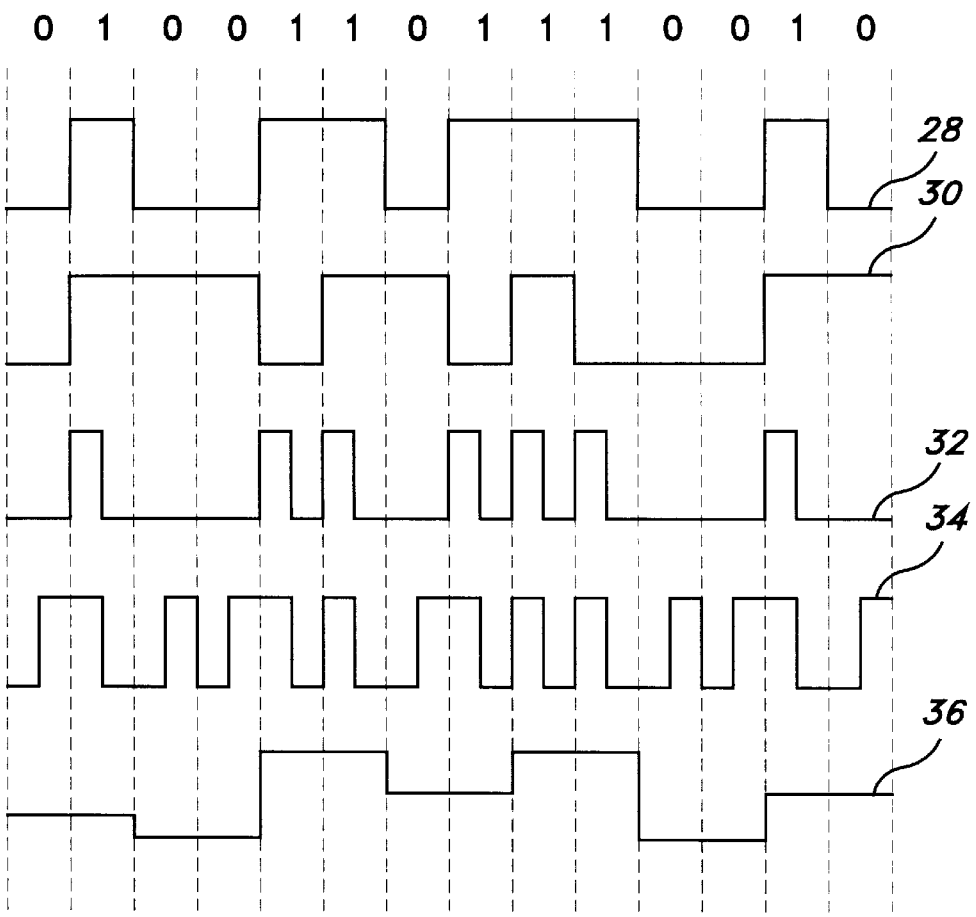
FIG. 2A is a diagram of data modulated by various methods of the prior art.
Figure 2B:
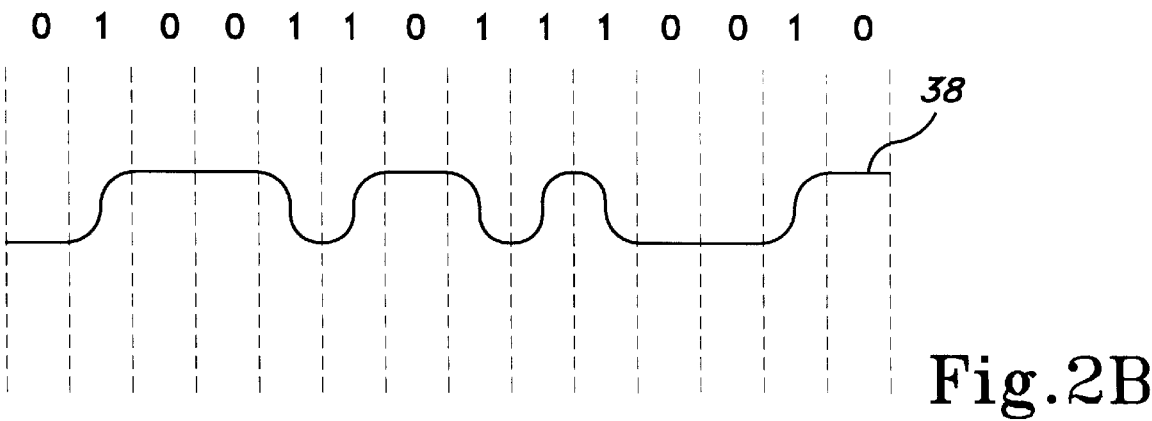
FIG. 2B is a diagram of the same data modulated using cosine segment modulation according to the invention.
Figure 2C:
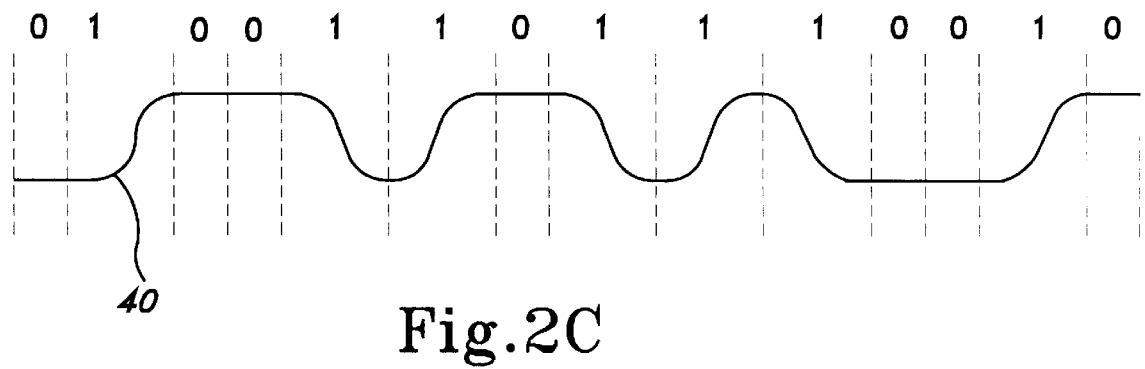
FIG. 2C is a diagram of the same data modulated using time-shift keyed cosine segment modulation.
Figure 3:
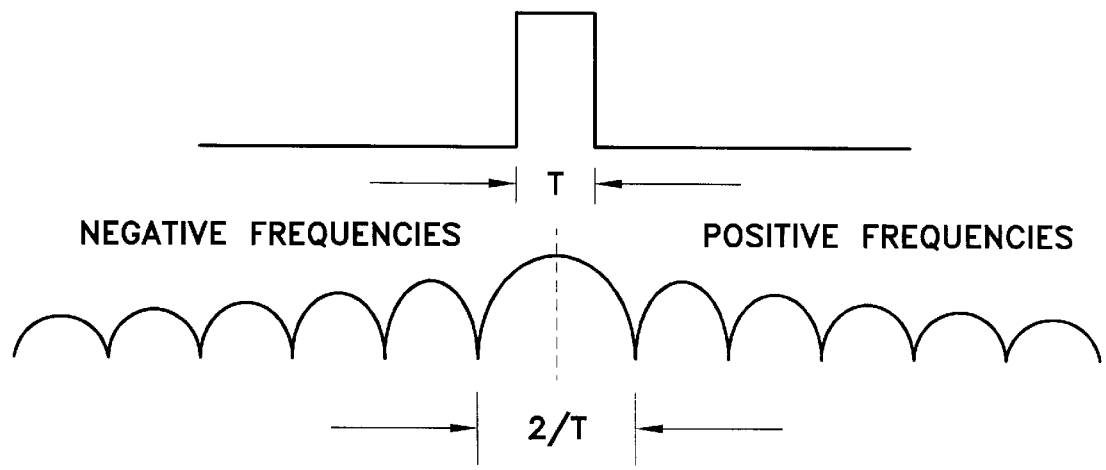
FIG. 3 illustrates a rectangular pulse and its associated bandwidth as known in the prior art.

If a one pi radian cosine segment is used to represent one symbol and no level change is used for the other symbol, a new digital encoding technique called discrete cosine segment modulation can be achieved. FIG. 2A illustrates various modulation techniques which are well known in the prior art. Symbols 28, 30, 32, 34 and 36 respectively represent NRZ-Level modulation, NRZ-Mark modulation, RZ modulation, Bi-Phase-Level (Manchester) modulation, and NRZ-4Level modulation. FIG. 2B illustrates discrete cosine segment modulation 38 of the same data shown in FIG. 2A. If the principle of time shift keying is employed, the bit times do not have to be equal. This means that one symbol time is different from the other and this effect can be used to reduce the bandwidth needed to transmit the digital data. This form of digital modulation I call time shift keyed cosine segment modulation. FIG. 2C illustrates symbol 40 which results from time shift keyed cosine segment modulation of the same data used in FIG. 2A. Thus, by reducing the bit time for the symbol that contains no slope change, the modulated bandwidth can be reduced significantly. This reduction in bandwidth is achieved while using only two symbols. Since conventional bandwidth reduction methods require additional symbols, this means the complexity of the demodulation process is greatly reduced since only two symbols need to be decoded.

The modulated carrier signal must subsequently be transmitted to a remote location. Furthermore, the remote location should be capable of receiving the carrier and demodulating it so that the digital base band information is recovered. Demodulation of digitally encoded cosine segment data requires techniques which differ from conventional demodulation because the eye pattern which is common to conventional demodulation is not necessarily produced by cosine segment modulation. Conventional modulation requires filtering of the symbol because the bit edges occur at the voltage transition points and must be filtered to the zero volt threshold in order to remove spurious outputs. The voltage amplitude of the symbol must be detected at the mid point of the symbol. For cosine segment modulation however, the highest voltage amplitude occurs at the bit edges and the midpoint of the symbol is where the zero voltage threshold is crossed. Accordingly, the relative voltage amplitude is unnecessary for demodulation of the symbol when cosine segment modulation is used. Only the occurrence of a zero voltage crossing needs to be detected. Thus, demodulation of the symbol has changed from being an amplitude sensitive process to one of significantly reduced sensitivity regarding amplitude disturbances from noise and interference.

In conventional demodulation of two unique symbols, symbol one would be detectable if it passes above the positive voltage threshold at the mid point of the bit time. Symbol two would be detectable if it passes below the negative threshold at the mid point of the bit time. Now consider cosine segment demodulation for two unique symbols where one symbol is represented by a cosine segment of pi radians while the other symbol is represented by a zero slope level segment. Both symbols have an equal bit time The first symbol would be detectable if it passes through the zero voltage threshold at the midpoint of the bit time. The second symbol would be detectable if it does not pass through the zero voltage threshold at any point during the bit time.

Consider now, time shift keyed cosine segment demodulation for two unique symbols where one symbol is represented by a cosine segment of pi radians and the other symbol is represented by a zero slope level segment combined with a cosine segment of pi radians. The second symbol is represented in a bit time which is greater than that of the first symbol. The first symbol would be detectable if it passes through the zero voltage threshold at the midpoint of the bit time, which is unique for each symbol. The second symbol would be detectable if it does not pass through the zero voltage threshold at the midpoint of the bit time. Each symbol is therefore detected by measuring the elapsed time from the previous symbol's zero voltage crossing until the next zero voltage crossing occurs. A time threshold is set between these two bit times and a zero crossing before this time threshold corresponds to the first symbol and a zero crossing after this time threshold corresponds to the second symbol.

FIG. 4 illustrates a demodulator circuit 42 in accordance with the present invention. The demodulator circuit 42 includes a receiver 44, a first filter 46, a mixer 48, an oscillator 50, a second filter 52, and a symbol detector 54. The receiver 44 receives the modulated digital signal and directs it to the first filter 46, which is a bandpass filter. The bandpass filter 46 reduces noise and interference which is outside of the bandwidth of the two carrier segments and directs the resulting signal to the mixer 48. The mixer 48 includes a first and second input for receiving signals from the bandpass filter 46 and the oscillator 50. The oscillator 50 is set to the same frequency as one of the carrier segments. The mixer 48 is used to downconvert the symbol frequency to the lowest possible value by producing the sum and difference frequencies. Thus, carrier segments having the same frequency as the local oscillator 50 will have a beat frequency of 0 Hz. The other carrier segment will have a beat frequency equal to the frequency difference between the two carrier segments. The output of the mixer 46 is passed through a low pass filter 52 in order to demodulate cosine segment encoded data. A symbol detector 54 is then used to determine the presence or absence of cosine segments within a symbol time.

FIG. 5 illustrates a block diagram of a demodulator circuit 60 for use with time shift keyed cosine segment modulated data. The demodulator circuit 60 includes a receiver 62, a filter 64, a peak detector 66, and a time shift detector 68. The carrier signal is received by the receiver 62 and directed to the filter 64 in order to remove noise and interference which is outside of the bandwidth of the two carrier segments and directs the resulting signal to the peak detector 66. The peak detector 66 processes the signal as previously described and directs the output to the time shift detector 68. The time shift detector 68 includes a microprocessor in order to analyze the incoming signal and recover the base band digital data.

Figure 7:
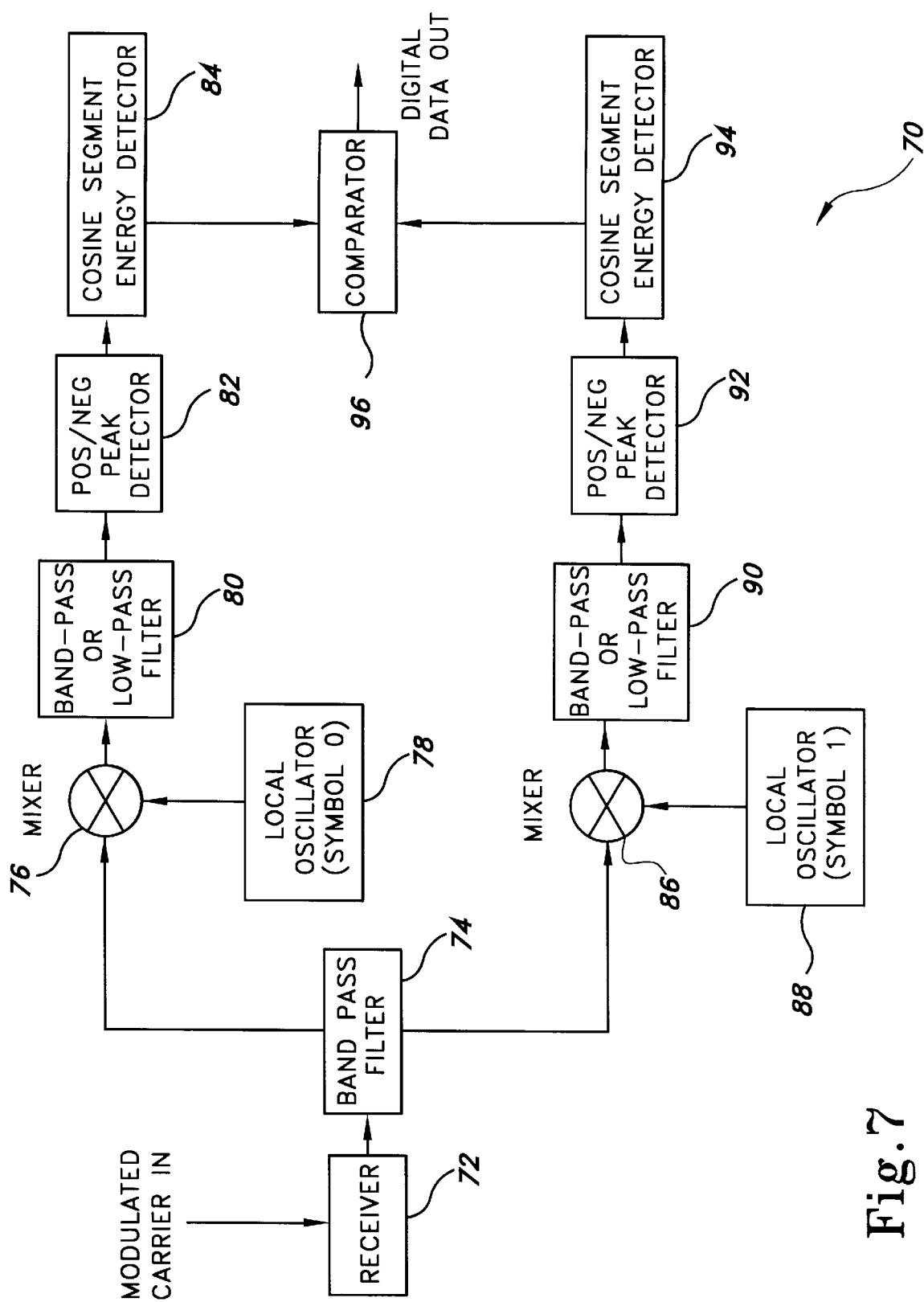
FIG. 7 is a block diagram of a demodulator circuit for use with data which has been modulated with multiple cosine segments

FIG. 7 illustrates an alternative embodiment of a block diagram of a demodulator circuit 70. A receiver 72 receives the digitally modulated carrier signal and directs it to a bandpass filter 74 in order to remove noise and interference which is outside of the bandwidth of the two carrier segments. The bandpass filter 74 includes two outputs for directing the resulting signal to a first mixer 76 and a second mixer 86. First and second local oscillators 78, 88 are respectively coupled to the first and second mixers 76, 86. The first mixer 76 is used to downconvert one of the symbol frequencies to the lowest possible value by producing the sum and difference frequencies. Thus, carrier segments having the same frequency as the first local oscillator 78 will have a beat frequency of zero hertz. The second mixer 86 is used to downconvert the other symbol frequency to the lowest possible value by producing the sum and difference frequencies. Thus, carrier segments having the same frequency as the second local oscillator 88 will have a beat frequency of zero hertz. The output of the first mixer 76 is filtered and directed to a first peak detector 82. The output of the first peak detector 82 is subsequently directed to a first cosine segment energy detector 84. The output of the second mixer 86 is filtered by filter 90 and directed to a second peak detector 92. The output of the second peak detector 92 is subsequently directed to a second cosine segment energy detector 94.

Figure 8:
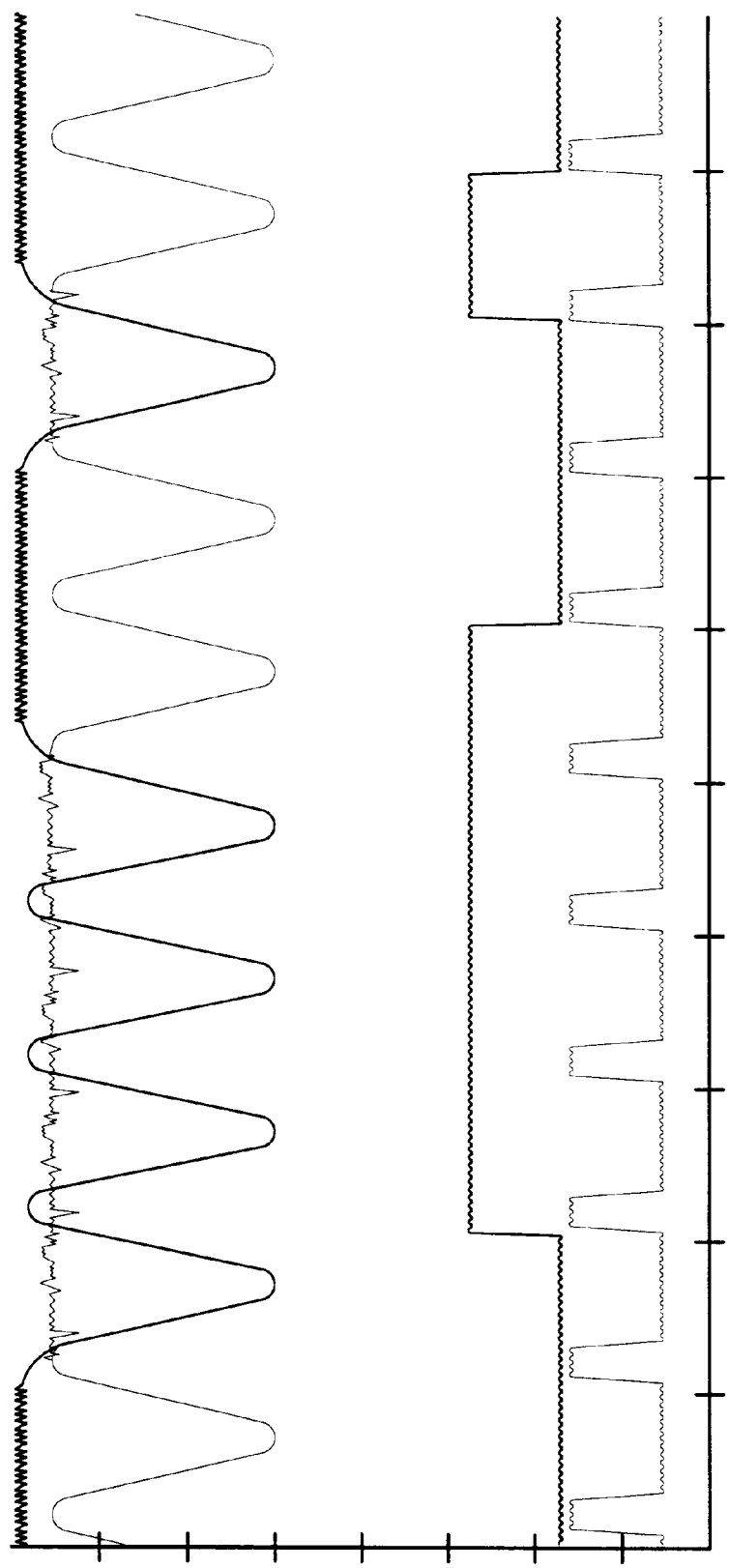
FIG. 8 is a plot of the filtered output of the mixers from FIG. 5.

The filtered outputs of the two mixers 76, 86 are illustrated in FIG. 8. A comparator circuit 96 receives the signals from the first and second cosine segment energy detectors 84, 94 and recovers the base band digital data based upon which detector produces the most energy. Turning again to FIG. 8, it is seen that the filtered output of the first mixer 76 will contain a zero slope segment having a minimum kinetic energy value when the incoming carrier frequency of symbol "0" matches the frequency of the first local oscillator 78. The output of the second mixer 86, on the other hand, contains a complete cosine cycle during the same symbol time since the second local oscillator's 88 frequency cannot match the frequency of the incoming modulated carrier. The cosine cycle produced by the second mixer 86 has a kinetic energy value which is maximized based upon the relative kinetic energies of the input carrier signal and the second local oscillator 88. The process is reversed for symbol "1".

Figure 9:
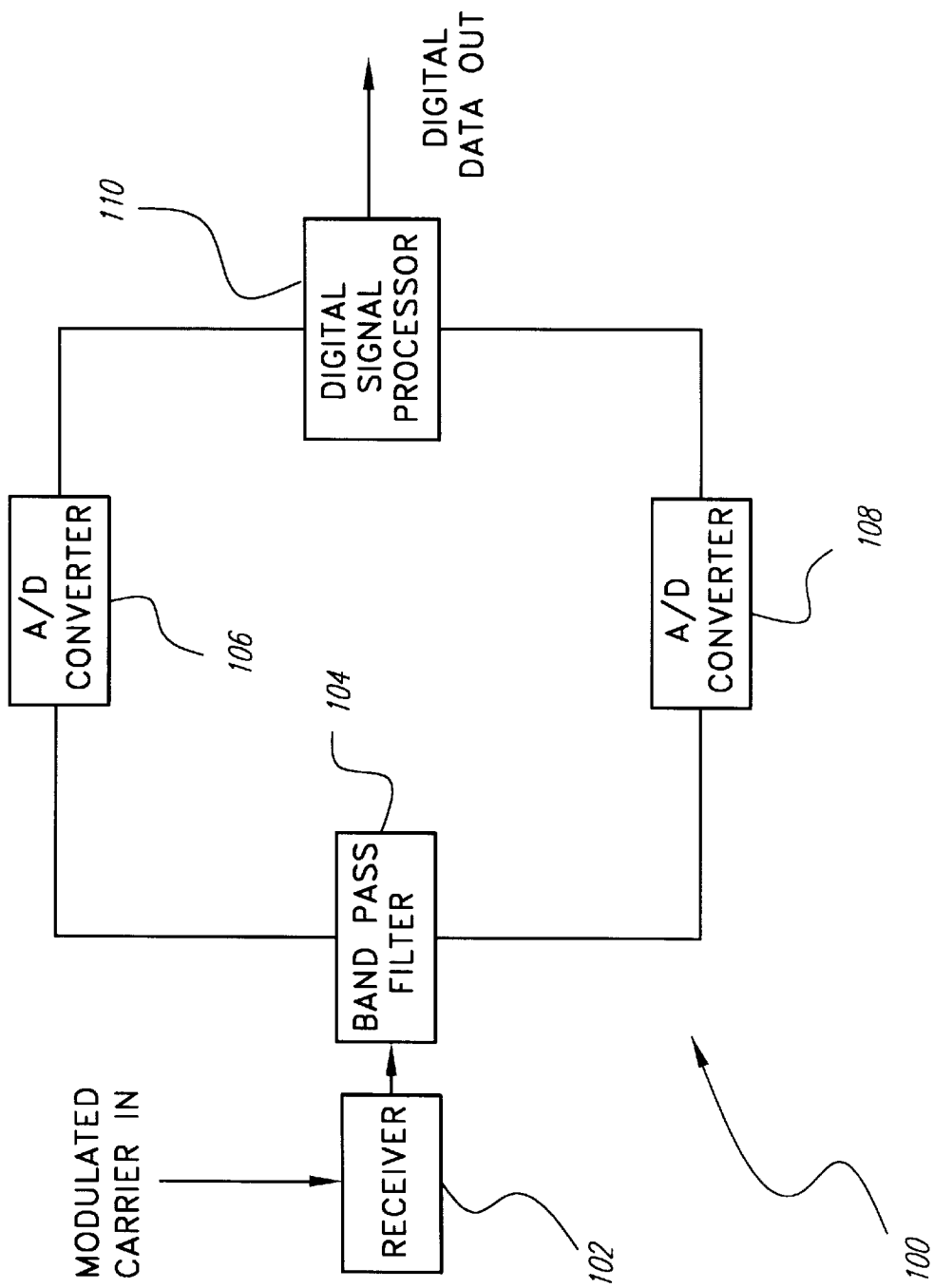
FIG. 9 is a block diagram of an alternative demodulator circuit.

FIG. 9 illustrates a block diagram of an alternative demodulating circuit 100. A receiver 102 receives the digitally modulated carrier signal and directs it to a bandpass filter 104 in order to remove noise and interference which is outside of the bandwidth of the two carrier segments. The bandpass filter 104 includes two outputs which direct the resulting signal to a first analog-to-digital converter 106 and a second analog-to-digital converter 108. The first analog-to-digital converter 106 samples at a rate which is related to the frequency of symbol "0". The second analog-to-digital converter 108 samples at a rate which is related to the frequency of symbol "1". The outputs of the first and second analog-to-digital converters 106, 108 are directed to a digital signal processor 110 which detects the cosine segment energy. This eliminates the use of local oscillators, band pass filters, and peak detectors which would otherwise be necessary for each of the two symbols.

Figure 10:
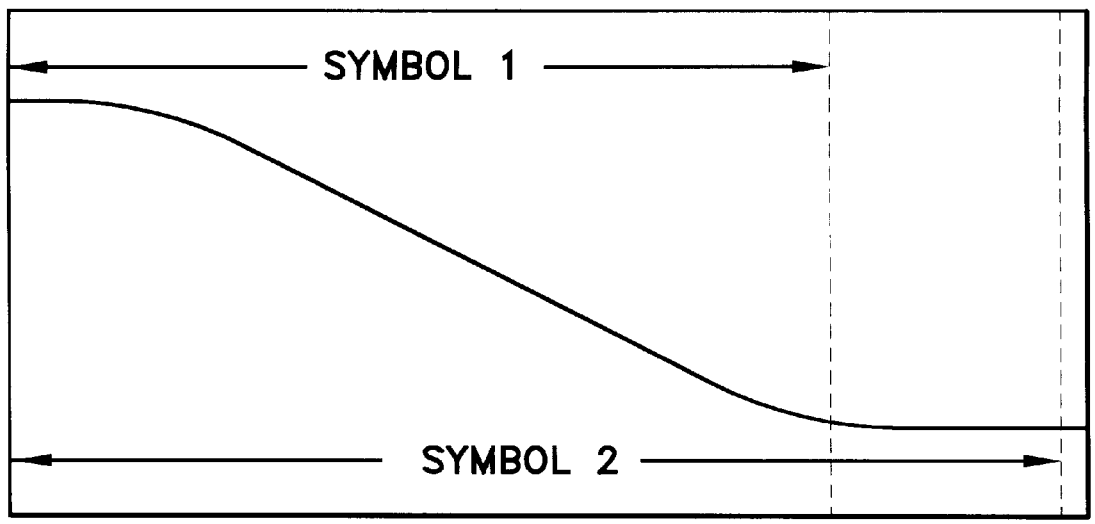
FIG. 10 illustrates two unique symbols capable of being used in cosine segment modulation.
Figure 11:
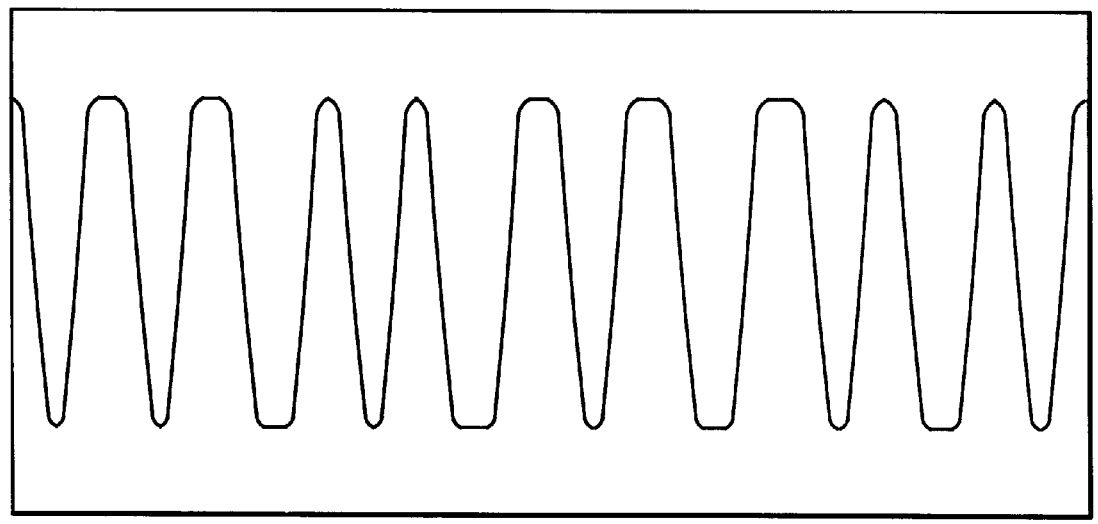
FIG. 11 is a diagram of data modulated using the symbols illustrated in FIG. 10.

FIGS. 10 and 11 illustrate another method of encoding two symbols using time shift keyed cosine segments to represent digital data. The coding for one symbol, represented in FIG. 10 as 'Symbol 1', is represented as a cosine segment while the coding for the other symbol, represented in FIG. 10 as 'Symbol 2', is represented as the same cosine segment with an additional zero slope segment added to it. When these symbols are added together in a phase continuous manner, a carrier signal is produced which looks very much like a pure sine wave. This carrier signal is illustrated in FIG. 11. This type of encoding has significant advantages over conventional encoding techniques. Since the digital symbols produced by time shift keyed cosine segment modulation do not contain vertical edges that must be carefully filtered, the resulting carrier only requires a very narrow bandwidth since the symbol bit edges transition so smoothly.

Figure 12A:
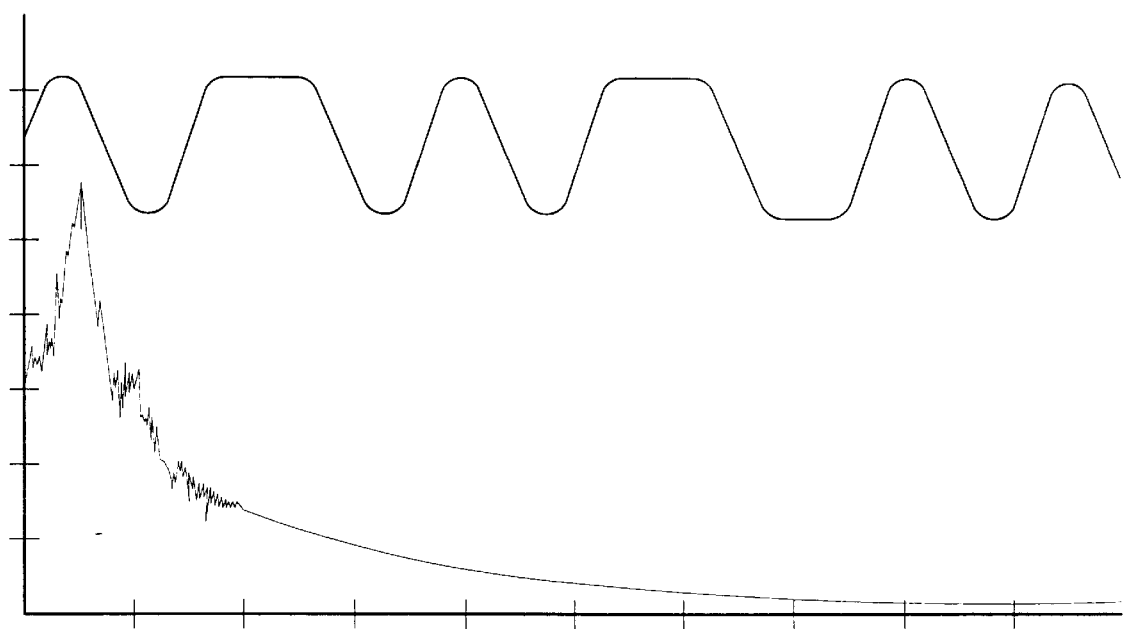
FIG. 12A is a frequency plot of the same data modulated with cosine segment modulation.
Figure 12B:
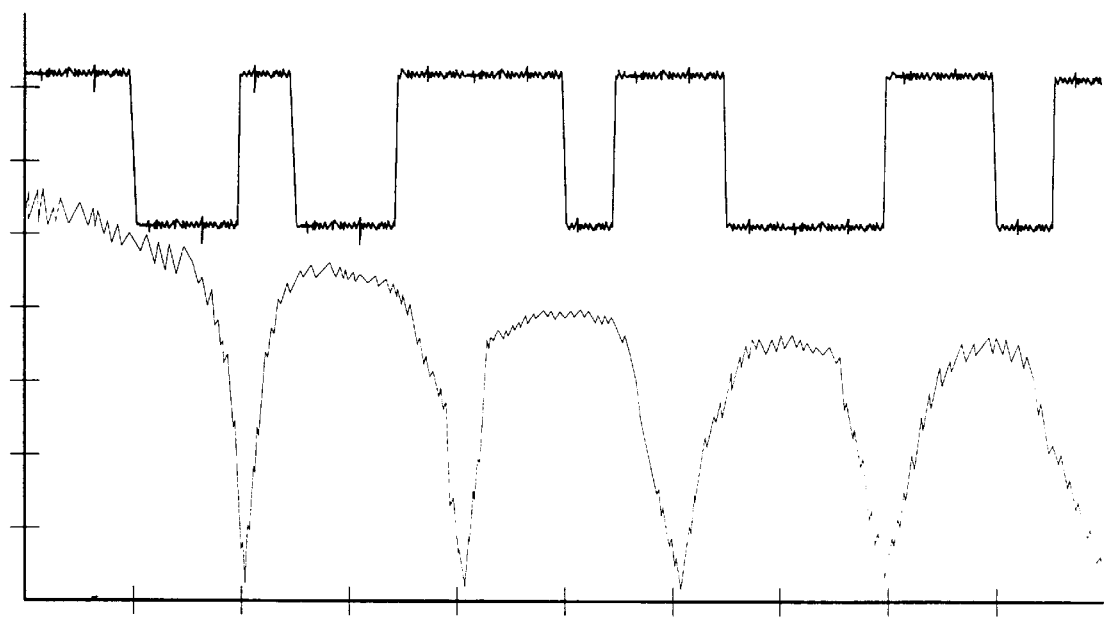
FIG. 12B is a frequency plot of the same data modulated with NRZ modulation.

FIG. 12A is a plot of the frequency spectrums of the data shown in FIG. 10 modulated using time shift keyed cosine segment modulation. FIG. 12B is a plot of the frequency spectrum of the data shown in FIG. 10 modulated using NRZ modulation. Examination of two frequency spectrum plots quickly reveals that NRZ modulation requires energy components from DC to the 1/T frequency as a minimum and filtering must be used to suppress energy components at frequencies above this point. On the other hand, time shift keyed cosine segment modulation has most of its energy at half the frequency of the 1/T point and energy components drop off very rapidly on both sides of this frequency peak without the use of filtering. This means there are no DC components in the spectrum and no negative frequencies which become apparent when this base band modulation is translated up in frequency.

Figure 13:
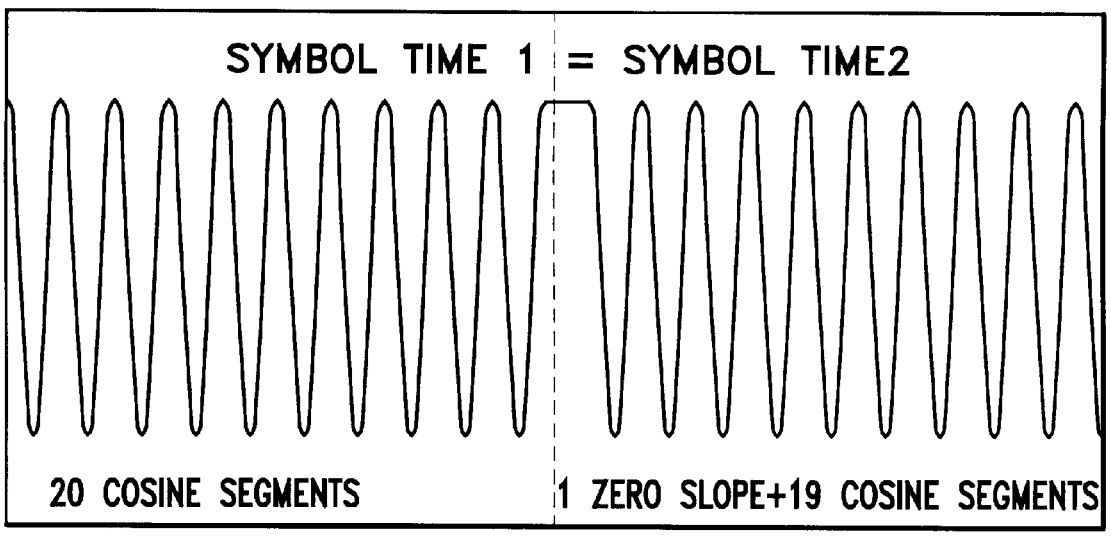
FIG. 13 is a diagram of phase-shift keyed data modulated using cosine segment modulation.
Figure 14:
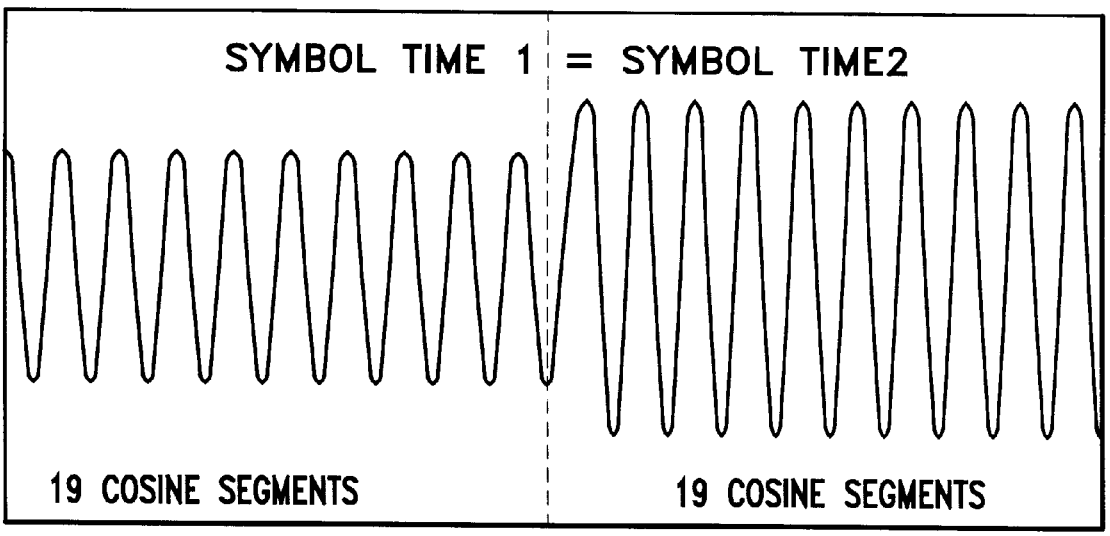
FIG. 14 is a diagram of amplitude-shift keyed data modulated using cosine segment modulation.

FIGS. 13 and 14 respectively illustrate the manner in which phase shifting and amplitude shifting would be accomplished using multiple cosine segment modulation. Phase shifting is accomplished by having one cosine segment out of twenty replaced by a zero slope segment in one of the symbols while the other symbol contains twenty equal cosine segments within the same symbol time. All symbol transitions again occur at zero slope points of the cosine segments. Amplitude shifting is accomplished by having one cosine segment of intermediate amplitude transition between symbols of equal phase and frequency, but different amplitudes. All symbol transitions again occur at zero slope points of the cosine segments. It is possible to create unique symbols comprised on both phase and amplitude variations by adding cosine segments off different amplitudes and zero slope segments together.

Figure 15:
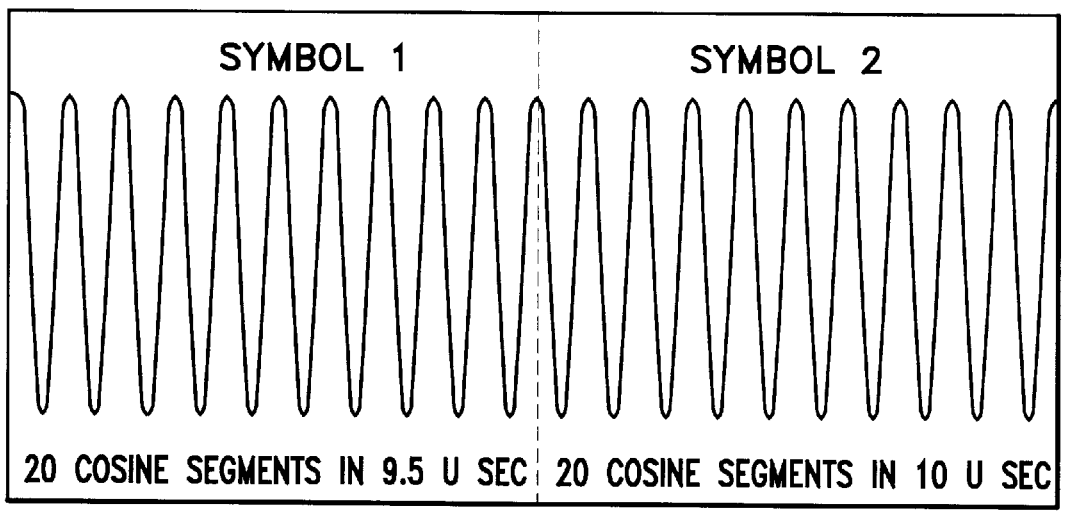
FIG. 15 is a diagram of time-shift keyed data modulated using cosine segment modulation.

It is also possible to use multiple cosine segments to create unique symbols at higher carrier frequencies using multiple cosine segment modulation, as illustrated in FIG. 15. Each cosine segment is one pi radians from zero slope to zero slope and all symbol transitions occur at a zero slope point. Each symbol contains, twenty cosine segments, however, the time periods for the two symbols are different. This technique can sometimes eliminate the frequency upconversion process that requires a local oscillator and mixer. Another benefit of multiple cosine segment modulation is its constant amplitude envelope that has a very narrow bandwidth without filtering.

Figure 16A:
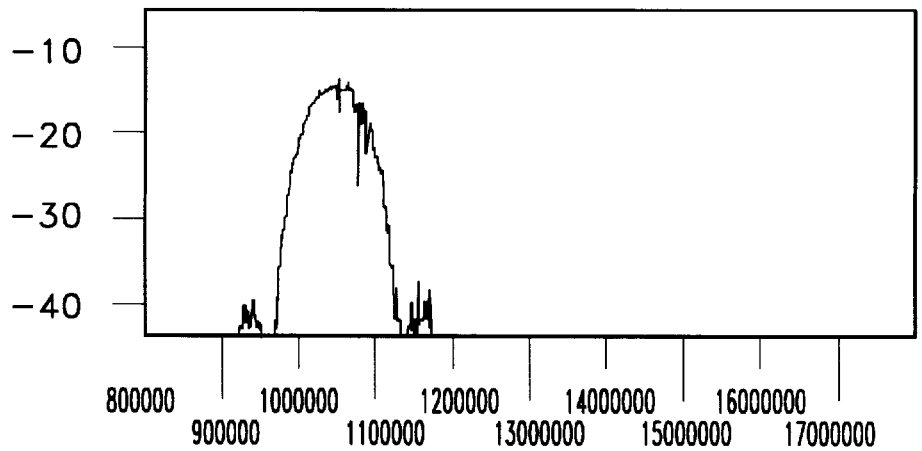
FIG. 16A is a frequency plot of the data shown in FIG. 13.
Figure 16B:
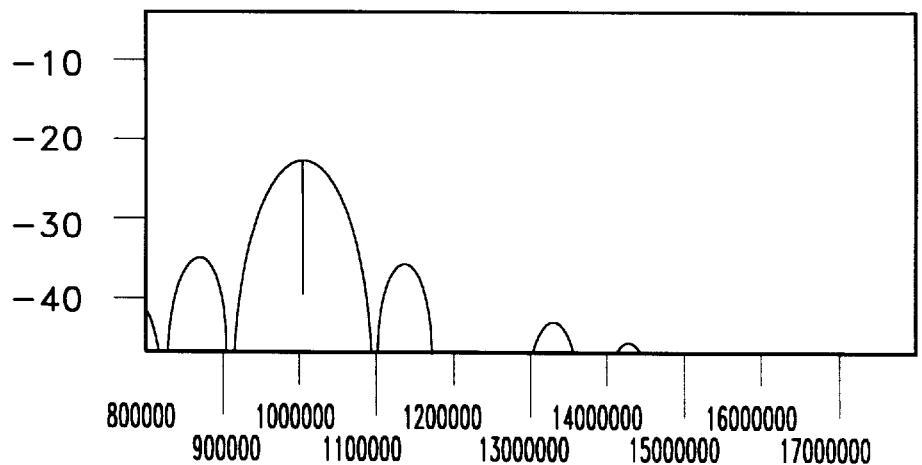
FIG. 16B is a frequency plot using traditional phase-shift keyed data without filtering.
Figure 16C:
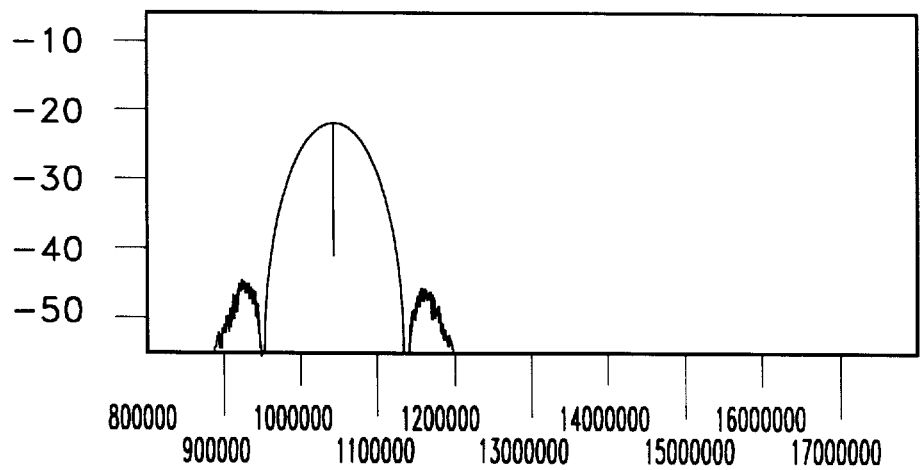
FIG. 16C is a frequency plot using traditional phase-shift keyed data in conjunction with a filter.

FIGS. 16A, 16B, and 16C comparatively illustrate the frequency plots of this data using multiple cosine segment modulation according to the invention and conventional phase shift keyed modulation. As seen in FIG. 16A, the multiple cosine segment modulation has a bandwidth which is essentially composed of the primary null to null energy lobe. Accordingly, there is only a minimal need for filtering. FIG. 16B however, illustrates the increased bandwidth created outside the primary lobe by phase shift keying, thus requiring the use of filters. FIG. 16C illustrates, the resulting bandwidth after filtering. Comparison of FIGS. 16A and 16C quickly reveals that multiple cosine segment modulation creates a more desirable bandwidth than the filtered phase shift keyed modulated data.

Figure 17:
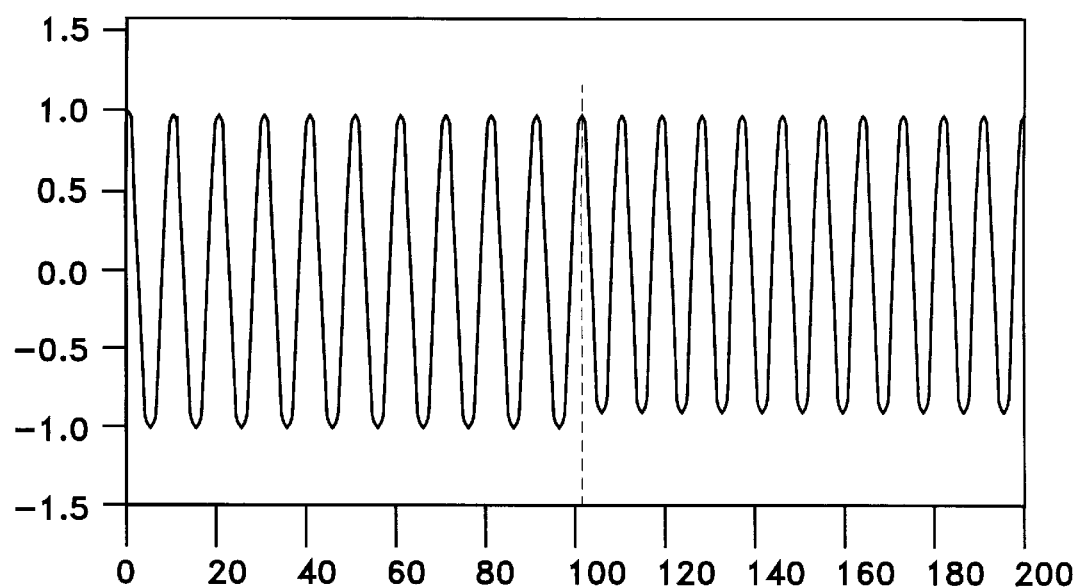
FIG. 17 is a diagram of cosine segment modulated data with one cycle difference between the symbols.
Figure 18:
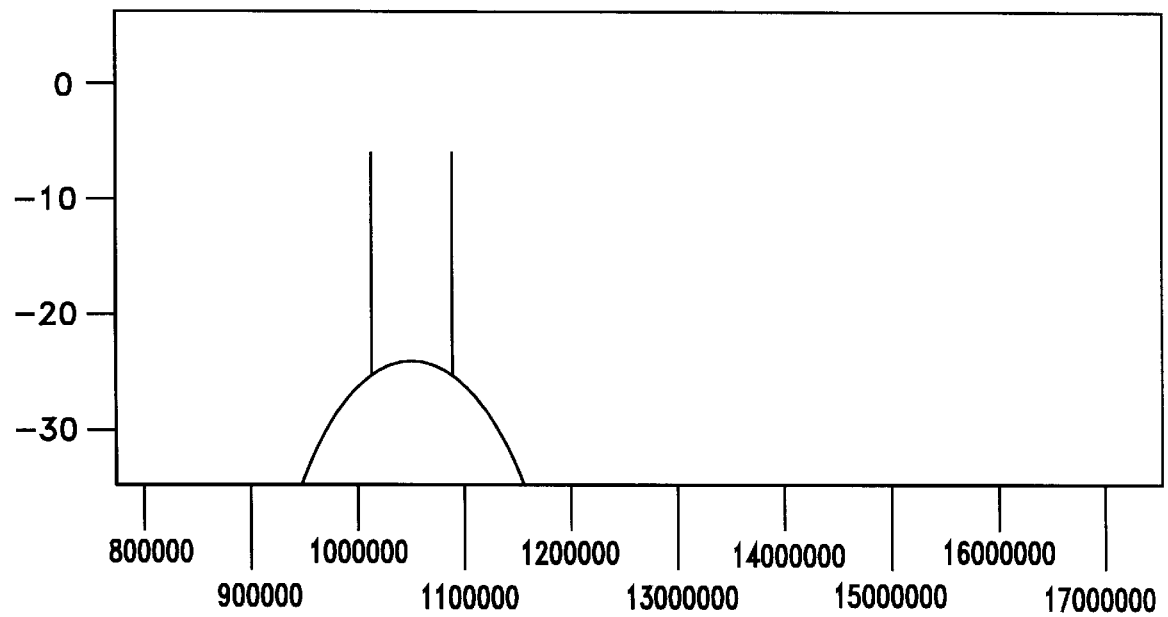
FIG. 18 is the frequency plot of the data illustrated in FIG. 17.

It is further possible to use multiple cosine segments to create unique symbols at higher carrier frequencies using multiple cosine segment modulation with equal bit times, as illustrated in FIG. 17. Each cosine segment is one pi radians from zero slope to zero slope and all symbol transitions occur at a zero slope point. The first symbol contains twenty cosine segments, while the second symbol contains twenty-two cosine segments. Since the bit times are equal, this represents one complete cosine cycle difference between the two symbols. FIG. 18 illustrates the resulting plot of the frequency spectrum. The main null to null energy lobe contains two energy spikes which are exactly 100 KHz apart, i.e. the cosine cycle difference between the two symbols multiplied by the bit rate. Furthermore, the two energy spikes contain 99% of the spectrum energy. The remainder of the energy lobe only represents 1% or less of the spectrum energy.

Figure 19:
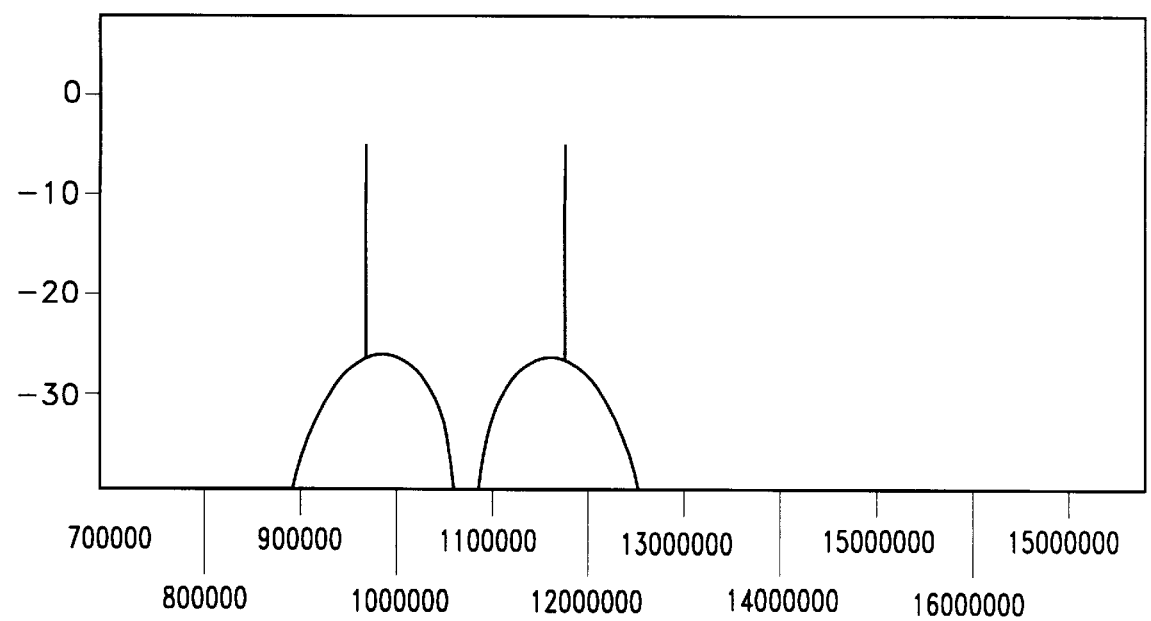
FIG. 19 is the frequency plot of cosine segment modulated data with a two cycle difference between the symbols.
Figure 20:
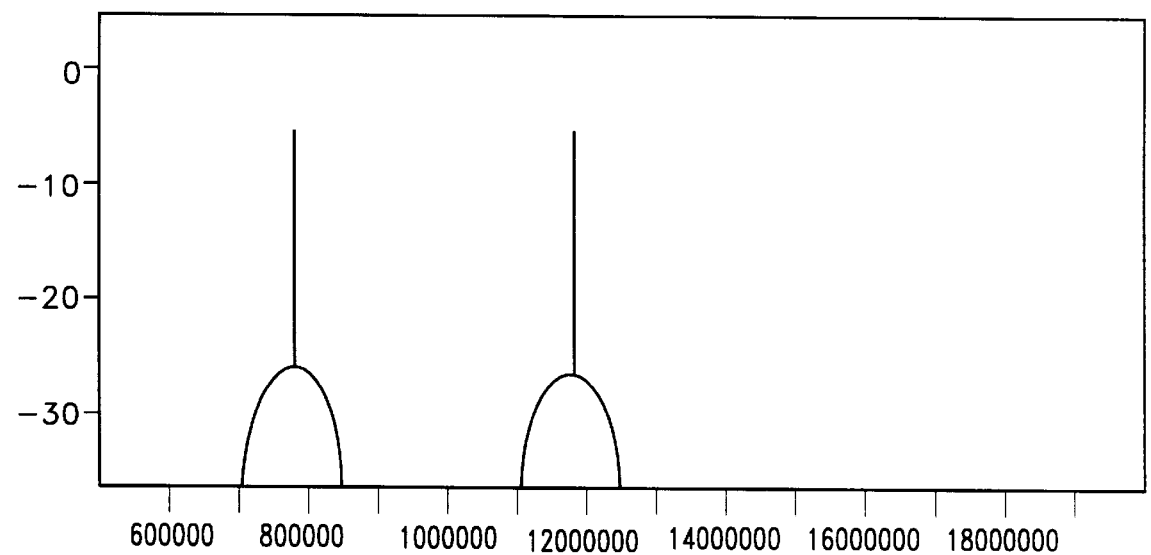
FIG. 20 is the frequency plot of cosine segment modulated data with a four cycle difference between the symbols.

If the two symbols are more than one cycle apart, then two primary null to null energy lobes are created, one for each symbol. This case is illustrated in FIGS. 19 and 20, which are representative of a two and a four cycle difference, respectively. As the difference in cycles between the two symbols increases, the main null to null energy lobes drift further apart. The distance between the resulting energy spikes would be 200 KHz and 400 KHz, respectively. This results from two cosine cycles and four cosine cycles being multiplied by the bit rate, respectively. However, each null to null energy lobe retains a single energy spike which contains nearly 50% of the spectrum energy.

As seen by intuitive examination of FIGS. 18 and 19, cosine segment modulation may also be used in frequency hopping or spread spectrum applications. This is based on the ability to transition to new carrier frequencies instantaneously without producing spurious output outside of the symbol frequencies and without the need for settling time. This allows transmission under noisy conditions by changing carrier frequencies in a predetermined manner with the receiver. Furthermore a more secure communications link can be achieved by constant cycling or changing of carrier frequencies.

In the burst mode digital communications system according to the invention, carrier segments and special symbols are initially transmitted at the beginning of the burst. These are designed to provide symbol edge synchronization which can be used for a long series of data symbols to follow. The amplitudes of the symbols are used as a standard from which voltage thresholds are derived After the synchronization symbols are transmitted, the data symbols can be changed to convey the maximum amount of detectable information between digital states so as to reduce ambiguity in the detection process. This technique can be especially useful in the presence of impairments such as signal interferers, multi-path reflections, or reflections caused by non-terminated wire or cable links. When two ends of a communications link have systems based on precision high speed system clocks, the small inherent frequency differences between the two systems can be ignored if the data bursts are small or interspersed with synchronization symbols during the data bursts.

For the reception and demodulation of data symbols in the proposed system, the receiver is based on digital techniques where analog-to-digital sampling of the received waveform first takes place. These data samples are first compared against an expected pattern or template to find the symbol edge synchronization. A known transmitted sequence of special preamble symbols, digitally sampled, allows the receiver to store these samples to be used as templates, uniquely defining the pattern for each digital state. Each subsequent received bit has its associated digital values compared against the stored templates to determine how many digital values matched the stored template values. The template with the highest number of matches then determines the decision as to which symbol was received. This technique is adaptive since the templates incorporate sampled digital values that already account for channel impairments. These templates are constantly updated for each data burst, which allows for increased immunity from multi-path or reflective impairments. This technique also allows very rapid acquisition of the data burst, which translates into higher data throughputs.

Figure 21:
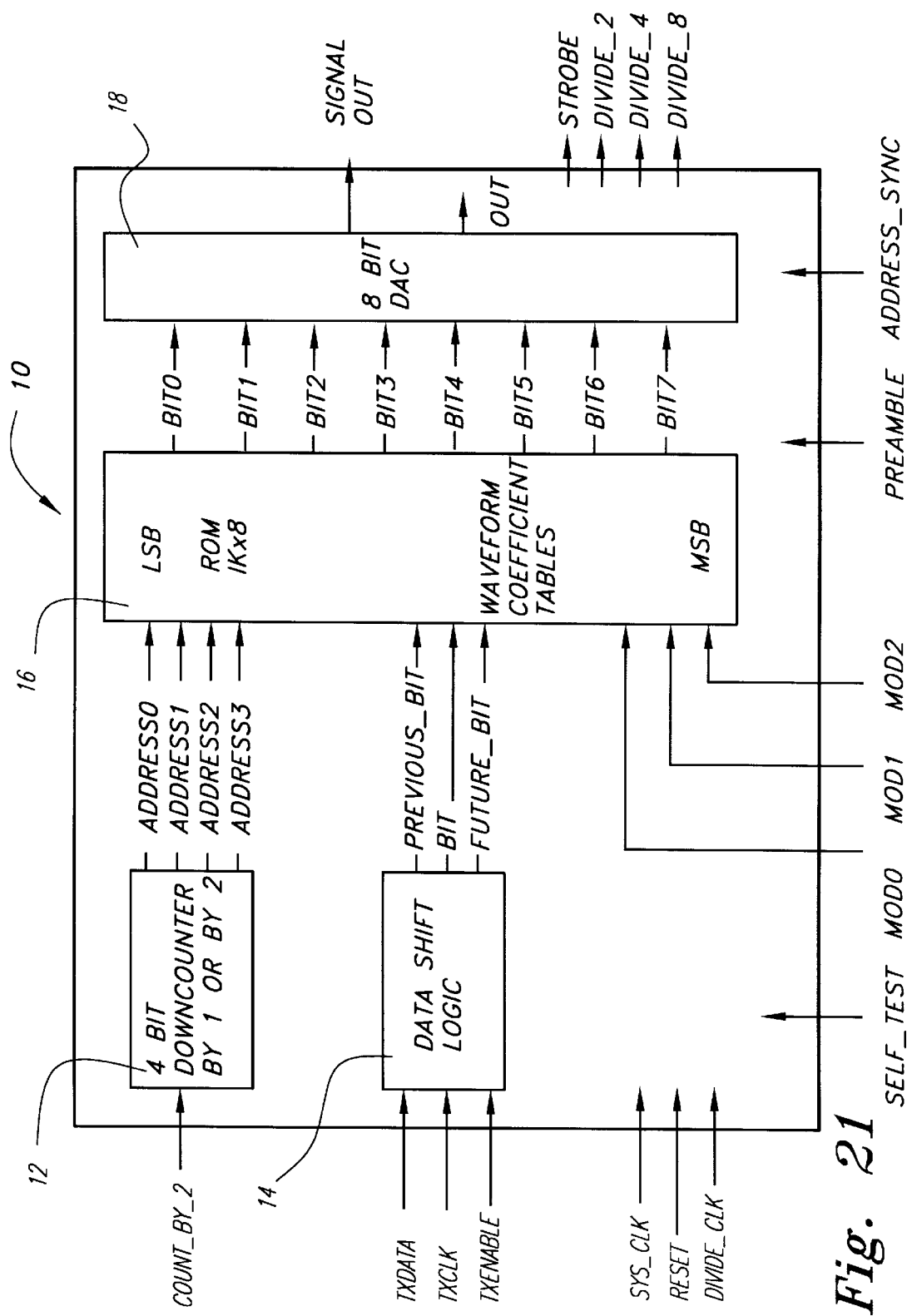
FIG. 21 is a block diagram of an alternative modulator circuit for carrying out the carrier segment modulation technique of the present invention.

A block diagram of an alternative modulator circuit 120 in chip form is shown in FIG. 21. This modulator circuit 120 may be used in a transmitter and includes a four-bit downcounter 122, a data shift logic 124, a read only memory (ROM) 126, and a digital-to-analog converter 128. To produce a sinusoidal frequency, amplitude coefficients are stored in the ROM 126 in the form of a cosine look-up table. As an example, assume that the amplitude of a cosine wave is measured at sixteen equal time intervals from the positive peak to the negative peak. These measurements when plotted and connected would define half of a cycle. These measurements are converted to binary numbers and stored in sixteen locations in the ROM cosine look-up table 126. To address those locations a four-bit downcounter 122 is used. A clock oscillator clocks the downcounter 122, alternately incrementing it from zero to fifteen and then decrementing it from fifteen to zero. This continues as long as the clock oscillator provides a clock. The four-bit output of the downcounter 122 addresses the ROM cosine look-up table 126, which sequentially outputs the amplitude coefficients to the digital-to-analog converter 128. The output of the digital-to-analog converter 128 will be a stepped representation of a cosine wave. To smooth the output of the digital-to-analog converter 128 and remove the small steps inherent in the digital process, a low pass filter may be used. The output of such a low pass filter would be a very clean sinusoidal shaped signal, the frequency of which is one thirty-second of the frequency of the clock oscillator. It takes sixteen counts to go from the negative peak to the positive peak and sixteen counts to go from the positive peak to the negative peak, completing the cycle.

The data shift logic 124 receives serial data, with an associated clock, and an enable signal. The serial data is clocked into a serial shift register, the outputs of which are used to select one of eight sub-tables in the ROM look-up table 126. Depending on the serial data stream, the three bits in the shift register may assume any one of eight states, from 000 to 111. Having the three bits available, i.e. the present bit and the first past and future bits, allows digital filtering of the coefficients by changing the look-up sub-table used. Within the ROM look-up table 126 are eight independent sub-tables, selected by the aforementioned three bits, which contain uniquely modified coefficients. The selective use, of these coefficient sub-tables is equivalent to using a finite impulse response (FIR) filter. The data shift logic 124 also provides a start signal to the downcounter 122, to begin the down-counting process, and receives an end-of-symbol back from the downcounter 122, indicating readiness to start another symbol. While three bits are used in this present embodiment to select one of eight sub-tables, it is anticipated that additional bits may be used to address additional sub-tables, thus providing more stringent FIR filtering.

The downcounter 122 provides the low-order address bits to the ROM look-up table 126. During power-up, or initialization, the downcounter 122 receives the value to be pre-loaded into the counter prior to down counting. This defines the number of steps required to reach zero and, consequently, the number of coefficients that will be addressed to output a symbol.

ROM 126 contains the symbol coefficients and is loaded at boot-up. During boot-up the value to be preloaded into the downcounter 122 is also stored. The sub-table select lines carry the most significant digits of the ROM address. The lines generated by the downcounter 122 carry the least significant digits of the ROM address. The bits of the coefficient thus addressed are output to the digital-to-analog converter 128.

The eight-bit digital-to-analog converter 128 receives eight coefficient bits from the ROM look-up table 126 and converts those eight bits to an appropriate output voltage level. Sequential coefficients from the ROM look-up table 126 will cause the output of the digital-to-analog converter 128 to output a symbol in a piece-wise fashion, i.e. in discrete voltage steps. A simple low-pass filter may be inserted between the converter 128 and a succeeding op-amp to smooth the steps to a continuous function.

A tri-state op-amp provides sufficient drive capability with low output impedance to drive the resultant symbol stream over an output signal wire. When the op-amp is not outputting a symbol stream, its output goes to a high-impedance state. This prevents loading of the signal wire and allows the signal wire to be used as a common communications link by other similar transmitters.

Figure 22:
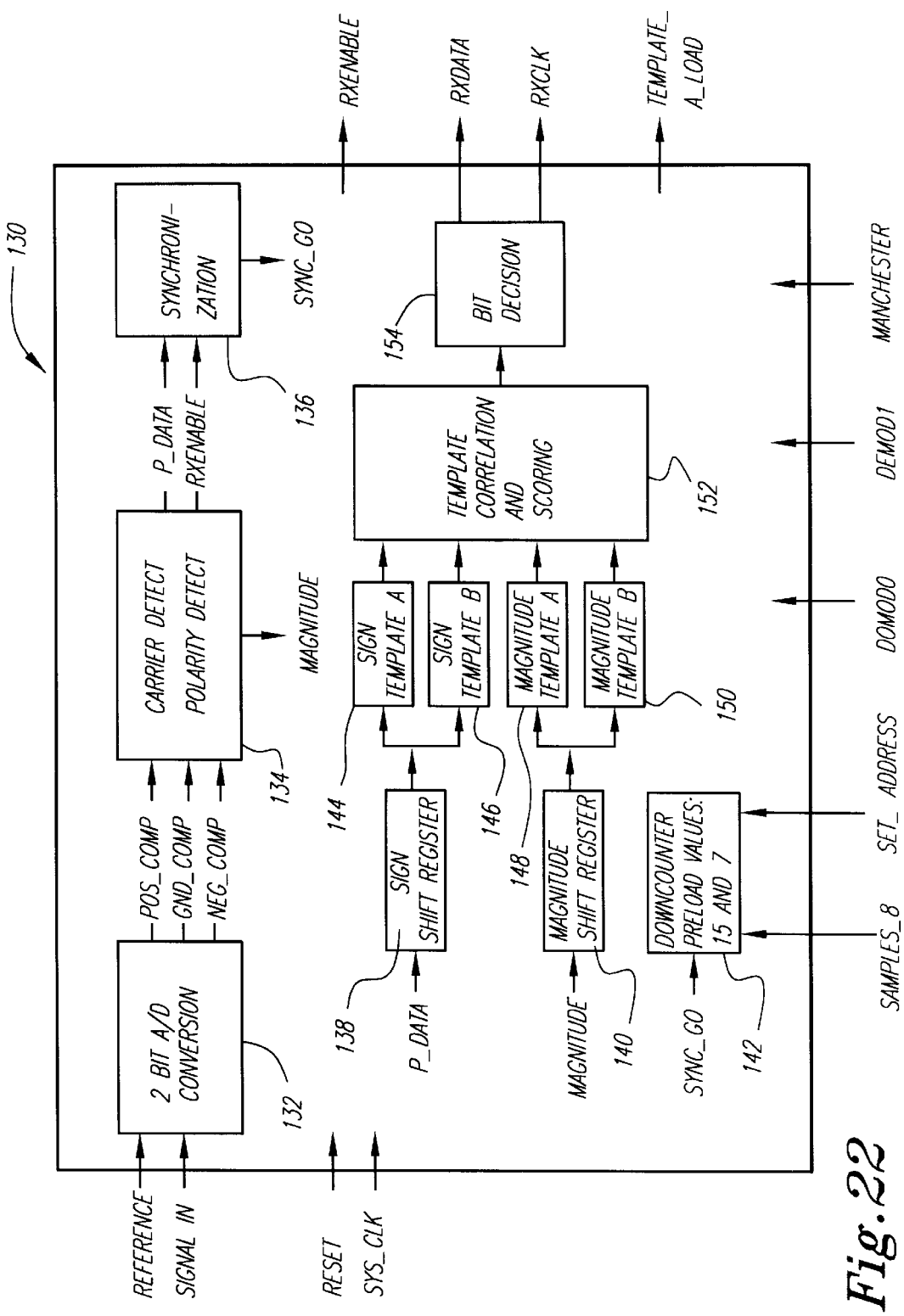
FIG. 22 is a block diagram of an alternative demodulator circuit for use with data which has been modulated with multiple carrier segments having zero slope edges.

FIG. 22 illustrates an alternative demodulator circuit 130 for use in a receiver which utilizes the adaptive templates to accurately interpret burst signals received. The demodulator circuit 130 includes a two bit analog-digital converter 132, a detector 134, a synchronization means 136, a sign shift register 138, a magnitude shift register 140, a downcounter 142, A and B sign templates 144, 146, A and B magnitude templates 148, 150, a template correlation and scoring means 152, and a bit decision means 154. Automatic gain control is not required but may be used to accommodate widely variant signal levels at the input to the threshold detection unit. When the first elements of a training sequence appear at the input, positive and negative voltage thresholds are set as a fixed percentage of the received signal amplitude. As these thresholds are exceeded by subsequent elements of the training sequence, the template storage and comparison unit begins a search for a starting pattern. During the search for a start pattern, the threshold detection unit uses a reference of zero volts. Therefore the output will be a logic one when the input voltage is above the threshold and a logic zero when the input voltage is below the threshold. The template storage and comparison unit will initiate a timing sequence when the start pattern is recognized. The threshold detection unit outputs logical data and, depending on the data's location in the timing sequence, certain data will be stored as templates to be used in demodulating successive symbols.

The training sequence incorporates all of the possible symbol transition cases for two bits, i.e. four possible combinations, such as a "1" symbol preceded by a "0" symbol, a "1" symbol preceded by a "1" symbol, a "0" symbol preceded by a "1" symbol and a "0" symbol preceded by a "0" symbol. The training sequence could also incorporate all of the possible symbol transition cases for three bits, i.e. eight possible combinations, such as a "1" symbol preceded by two "0" symbols, a "1" symbol preceded by a "1" symbol and a "0" symbol, a "1" symbol preceded by a "0" symbol and a "1" symbol, a "1" symbol preceded by two "1" symbols, a "0" symbol preceded by a "1" symbols and a "0" symbol, a "0" symbol preceded by a "0" symbol and a "1" symbol, a "0" symbol preceded by a "1" symbol and a "0" symbol, and a "0" symbol preceded by two "0" symbols.

By storing templates of all the transition and non-transition cases, a more accurate determination of subsequent symbols may be made. All data are fed to the template storage and comparison unit. This unit is responsible for initiating the timing sequence, storing the appropriate data bits as templates and comparing successive data bits with the templates. The best template match will determine which bit state to output. As the serial bits are output from the template storage and comparison unit, a clock derived from the timing sequence accompanies them.

Figure 23:
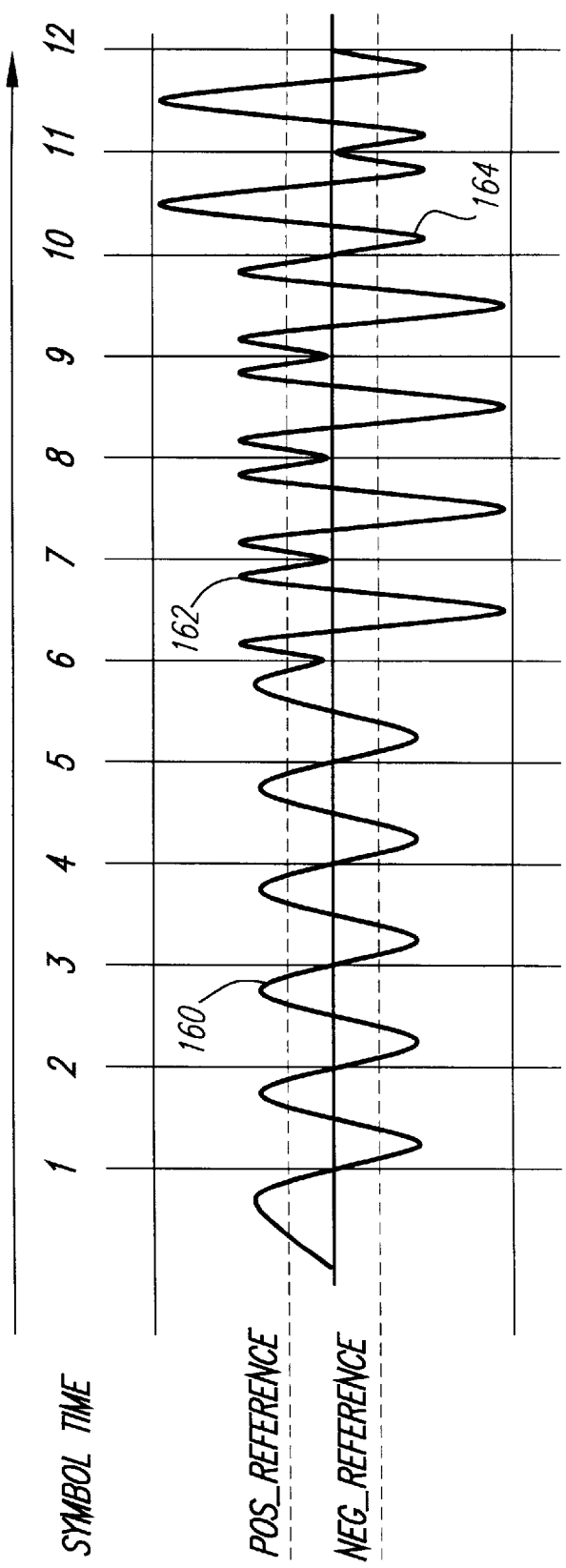
FIG. 23 is a diagram of a typical training sequence.

FIG. 23 illustrates a typical training sequence whereby, in burst mode, a receiver can rapidly determine correct signal templates to use for the symbols transmitted. The training sequence is always sent as the preamble to each data burst. The timing and data related to the training sequence is fixed and, as the training-symbol stream is received by the receiver, it is digitally sampled and stored as templates. In this manner the distortion introduced by the channel is accounted for in the stored templates. The stored templates are then used to compare with subsequently received symbols to make logical decisions. The assumption is that the path between a transmitter and a receiver will remain constant for the duration of a burst and, consequently, any distortions of the signal by the path. Sampling the known symbols in the training sequence and storing them permits the receiver to recognize the subsequent symbols without channel equalization, a process that is inefficient in burst transmissions The modulated signal comes into the modulator circuit 130 after being filtered and amplified. The first part of the demodulation process is a two-bit analog-to-digital conversion 132. This is accomplished by utilizing 3 comparators as a flash analog-to-digital conversion process. One comparator is referenced to ground, one comparator is externally referenced to a positive voltage (around 300 mV), and one comparator is referenced to the negative equivalent voltage. The output of the analog-to-digital conversion process is a binary number between 0 and 3. The positive referenced comparator (POS_COMP) and the negative referenced comparator (NEG_COMP) are also used to detect the presence of the carrier signal.

The incoming carrier signal must break the upper or lower comparator threshold for multiple sample periods to prevent noise from causing false indications of carrier detect. The output of the analog-to-digital conversion 132 is translated to a sign value and a magnitude value. The lower two analog-to-digital bits 00 and 01 are assigned a sign value of 0 while the upper two analog-to-digital bits 10 and 11 are assigned a sign value of 1. For magnitude values, analog-to-digital bits 01 and 10 are assigned a value of 0 and analog-to-digital bits 00 and 11 are assigned a magnitude value of 1. The sign value indicates whether the digital sample is above or below ground while the magnitude value indicates how far from ground the sample is located.

Each symbol is oversampled 8 or 16 times and each sample contains a sign and magnitude binary value. Each sign and magnitude symbol subsample is stored in a separate binary shift register 138,140. Next, the carrier signal must be synchronized to determine the symbol's leading and trailing edge. To provide symbol edge timing, each sign value of the shift register is compared against a fixed synchronization template. When a template match is found, the symbol edges are synchronized for the length of the packet.

From the moment TEMPLATE B is loaded, each incoming symbol is compared against the two templates. Each sample of the received symbol is matched against the sign and magnitude values of each template. At the end of all the sample points, the accumulator with highest score determines the decoded symbol. For example, if a symbol were oversampled by 16, a perfectly received symbol would score 32 (16 sign matches and 16 magnitude matches) against one template and 0 against the other template. Noise and impairments may cause the received symbols to become distorted so that the template scores are lower, but whichever template scores highest determines the data value of the received symbol.

The demodulation techniques are based on the comparison of the incoming signal against the variable templates loaded from the carrier signal during synchronization. There are 2 registers for each TEMPLATE. The TEMPLATE A registers are both loadable registers while the TEMPLATE B registers are shift registers where a sign value is shifted every clock into the sign shift register and a magnitude value is shifted every clock into the magnitude shift register.

Figure 24:
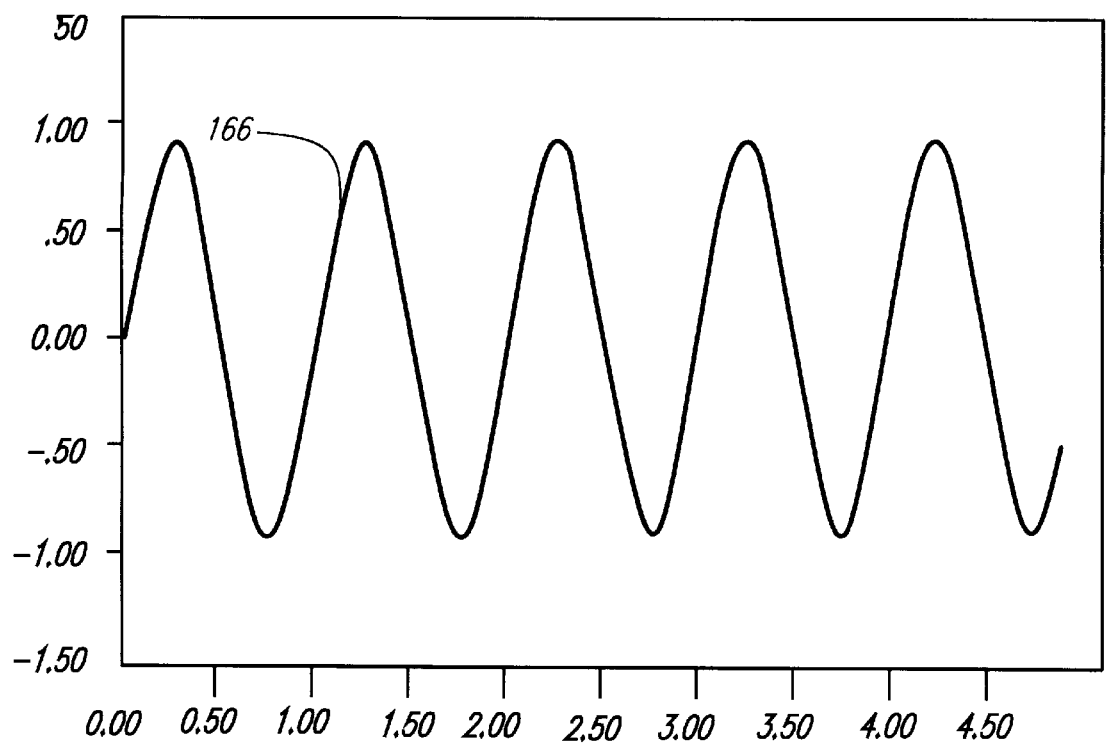
FIG. 24 shows a carrier segment having the form of a group of five sine cycles for use with one symbol.
Figure 25:
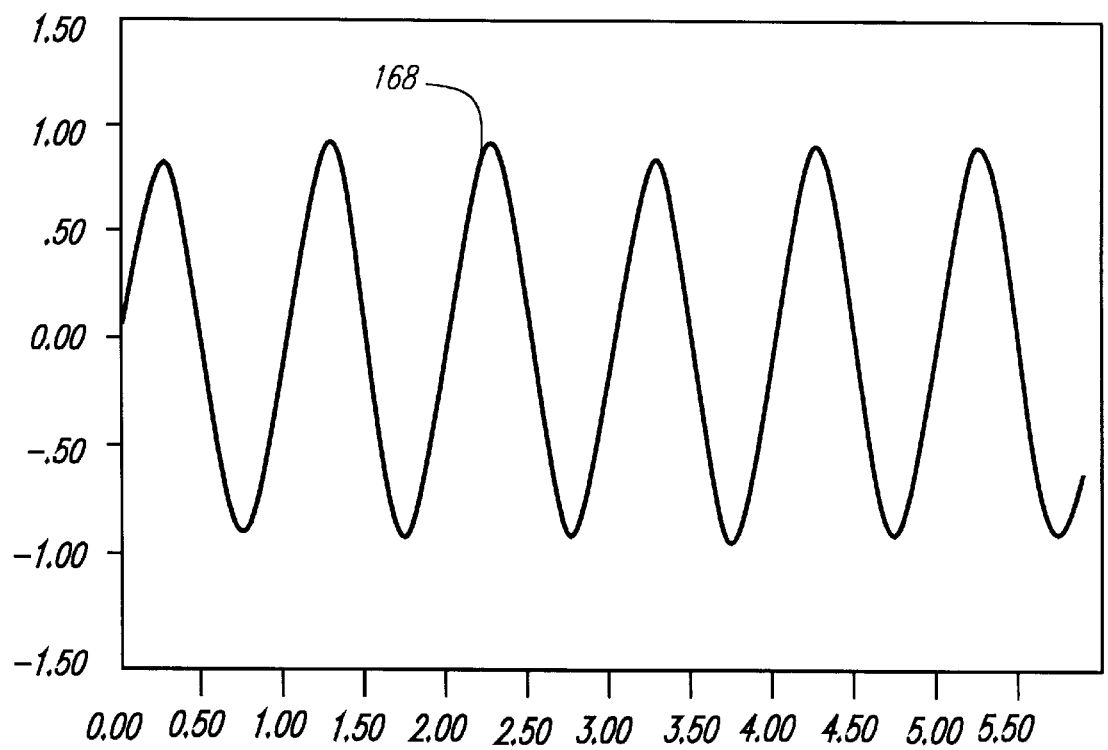
FIG. 25 shows a carrier segment which is orthogonal to the carrier segment shown in FIG. 24 and has the form of a group of six sine cycles for use with one symbol.
Figure 26:
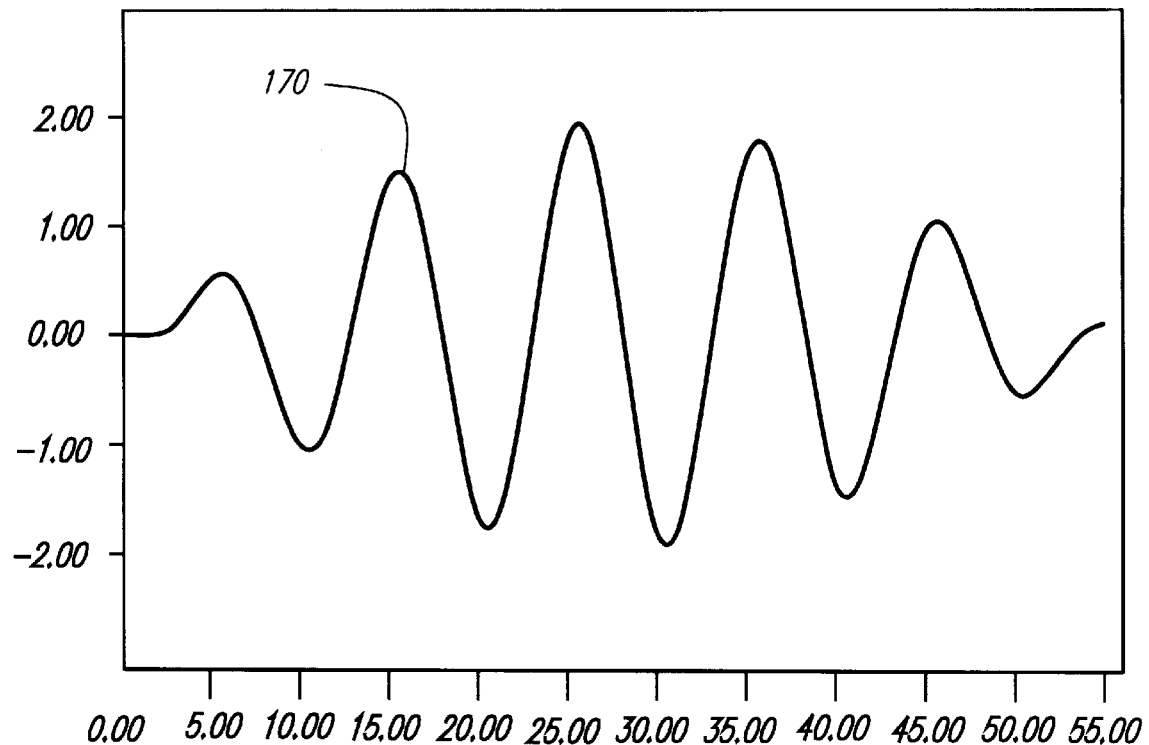
FIG. 26 shows a dual orthogonal frequency carrier summation of the group shown in FIG. 24 and the group shown in FIG. 25.
Figure 27:
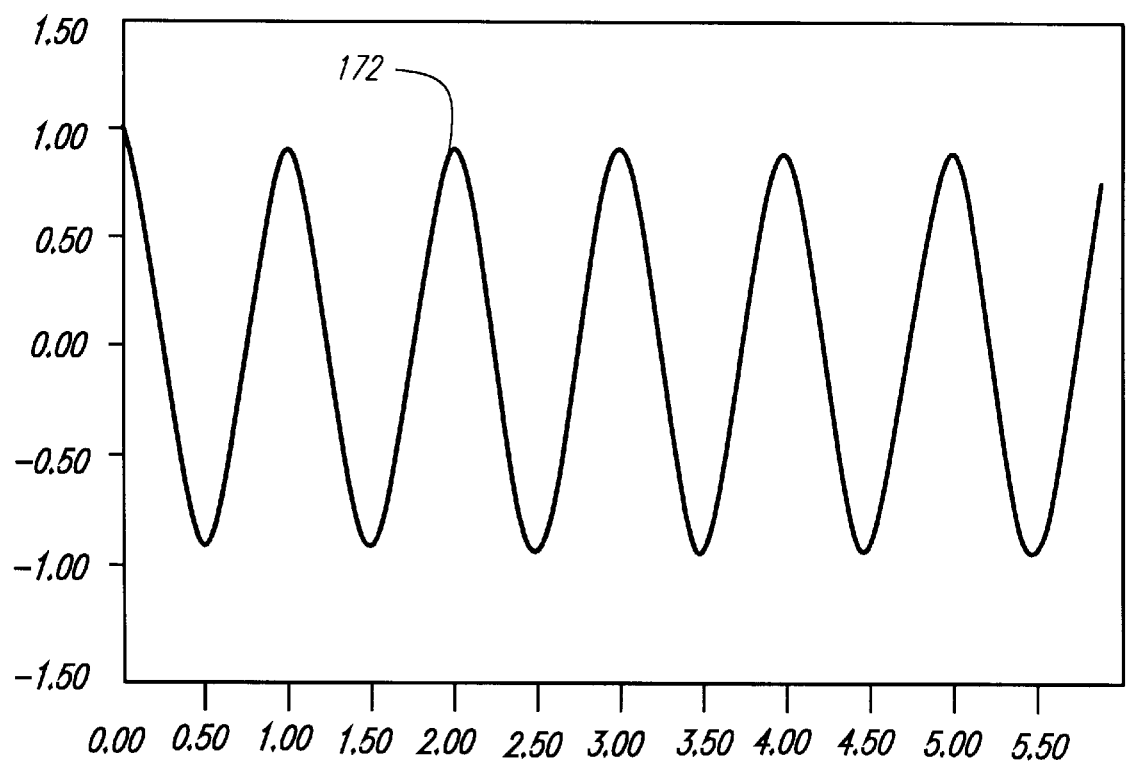
FIG. 27 shows a carrier segment having the form of a group of six cosine cycles for use with one symbol.
Figure 28:
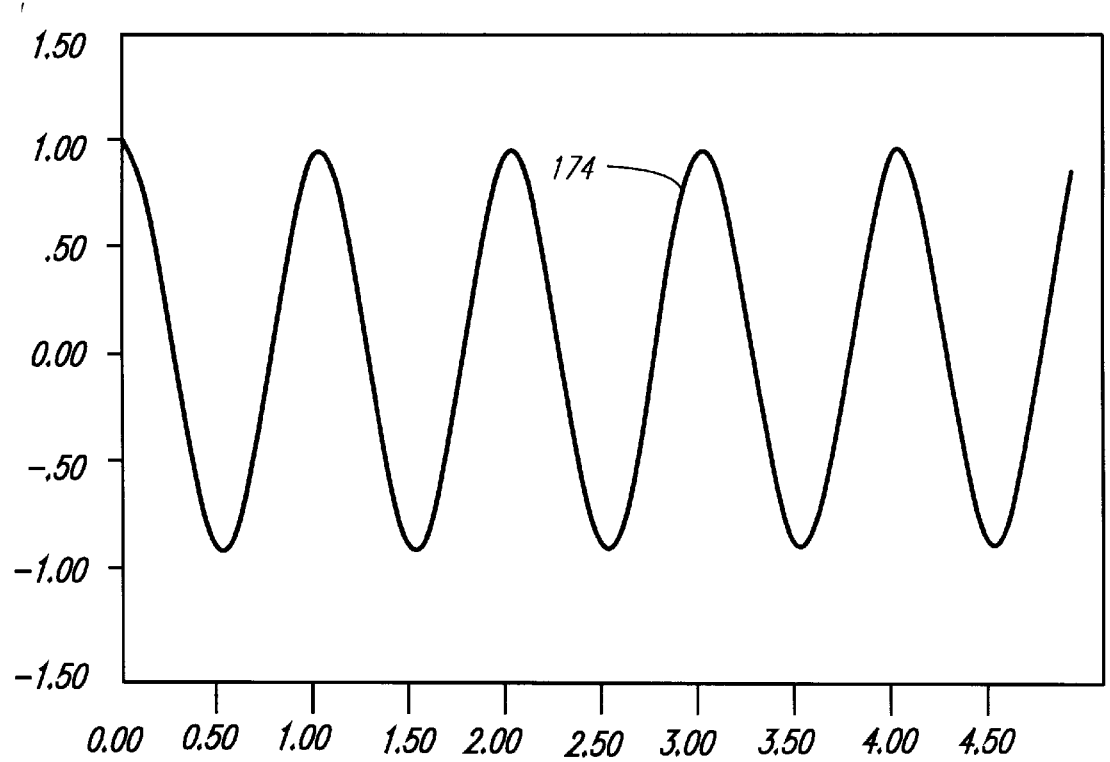
FIG. 28 shows a carrier segment which is orthogonal to the carrier segment shown in FIG. 27 and has the form of a group of six cosine cycles for use with one symbol.
Figure 29:
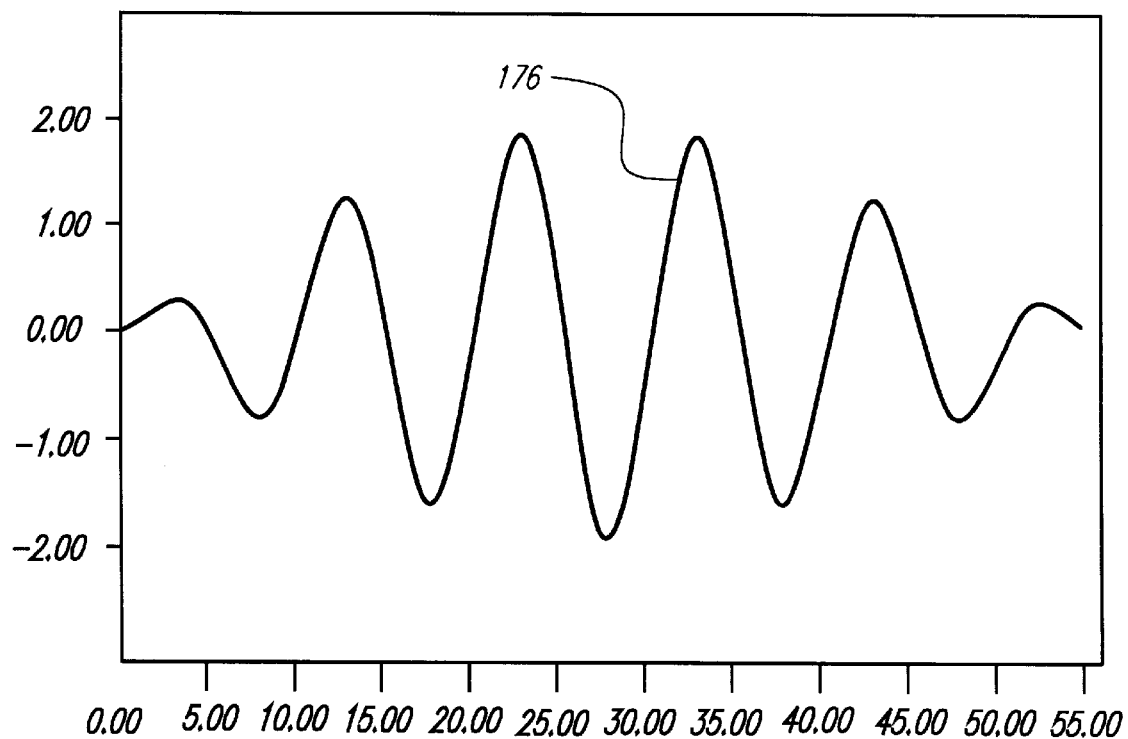
FIG. 29 shows a dual orthogonal frequency carrier summation of the group shown in FIG. 27 and the group shown in FIG. 28.

It is a further object of this invention to provide for multi-symbol communications using amplitude modulation in combination with frequency diversity. FIGS. 24–41 demonstrate the use of dual orthogonal frequency carriers in accordance with the invention. In a preferred embodiment two carrier segments are added to one another and are orthogonal in that they vary by at least one cycle and the resulting sum is non-destructive over a symbol time. The symbol edges of the dual orthogonal summed carriers occur at a minimum kinetic energy level. FIG. 24 shows a carrier segment 166 having the form of a group of five sine cycles for use with one symbol. FIG. 25 shows a carrier segment 168 which is orthogonal to the carrier segment 166 shown in FIG. 24 and has the form of a group of six sine cycles for use with one symbol FIG. 26 shows a dual orthogonal frequency carrier summation 170 of the group 166 shown in FIG. 24 and the group 168 shown in FIG. 25. FIG. 27 shows a carrier segment 172 having the form of a group of six cosine cycles for use with one symbol. FIG. 28 shows a carrier segment 174 which is orthogonal to the carrier segment 172 shown in FIG. 27 and has the form of a group of six cosine cycles for use with one symbol. FIG. 29 shows a dual orthogonal frequency carrier summation 176 of the group 172 shown in FIG. 27 and the group 174 shown in FIG. 28.

Figure 30:
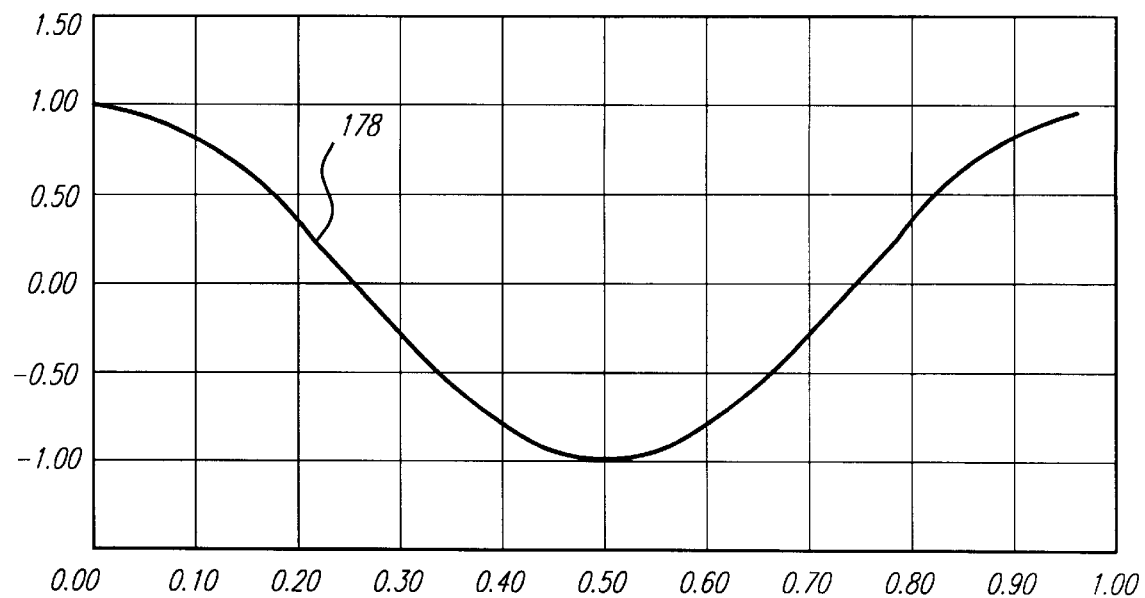
FIG. 30 shows a carrier segment having the form of one cosine cycle for use with one symbol.
Figure 31:
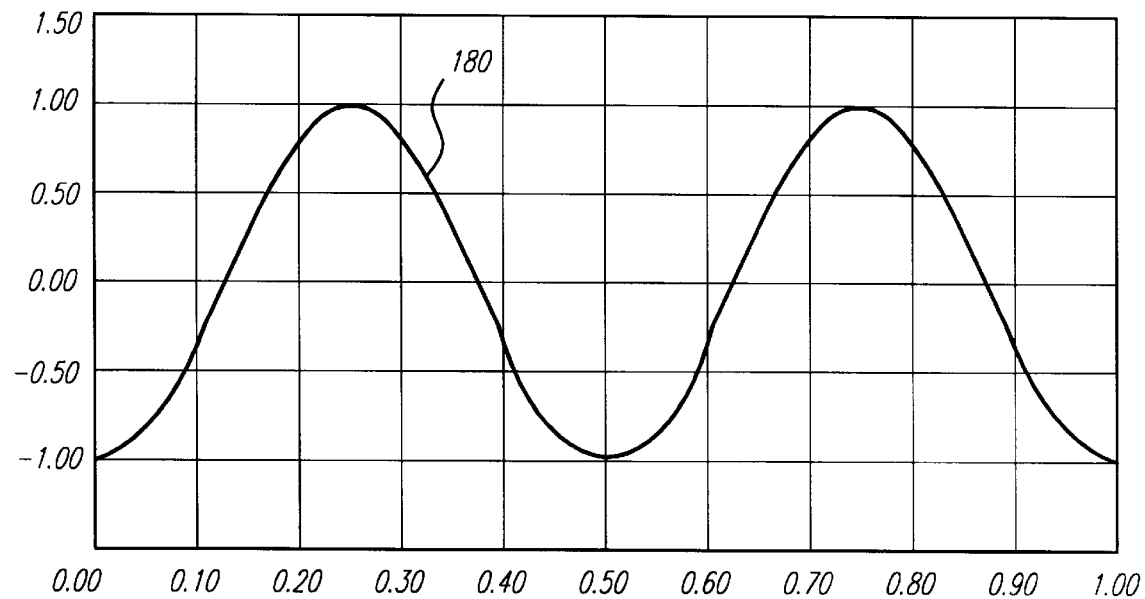
FIG. 31 shows a carrier segment which is orthogonal to the carrier segment shown in FIG. 30 and has the form of a group of two cosine cycles for use with one symbol.
Figure 32:
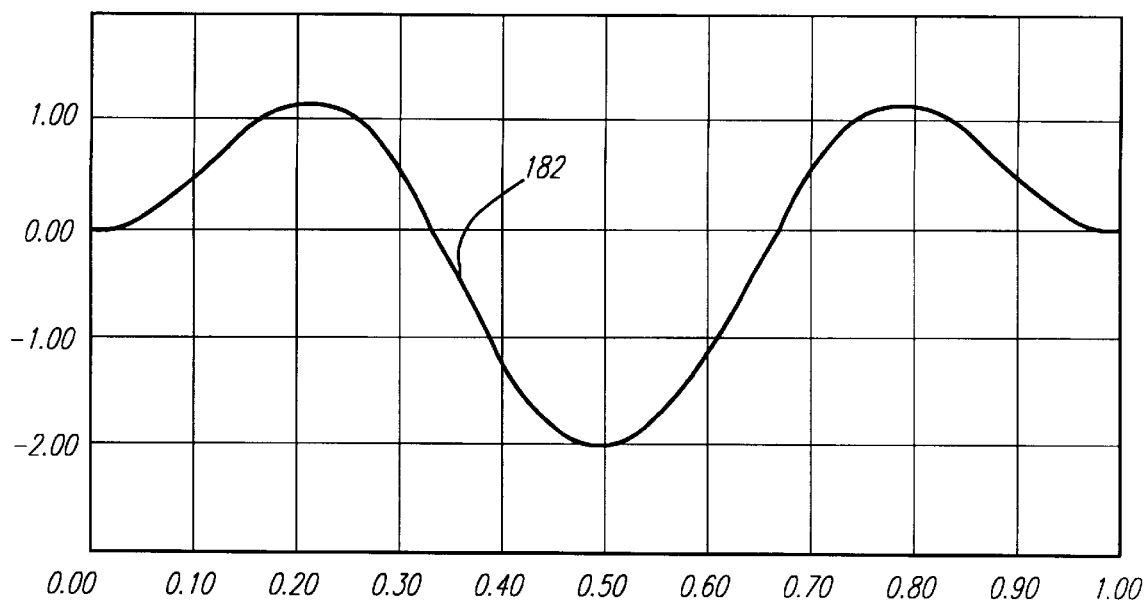
FIG. 32 shows a dual orthogonal frequency carrier summation of the cosine cycle shown in FIG. 30 and the two cosine cycles shown in FIG. 31.
Figure 33:
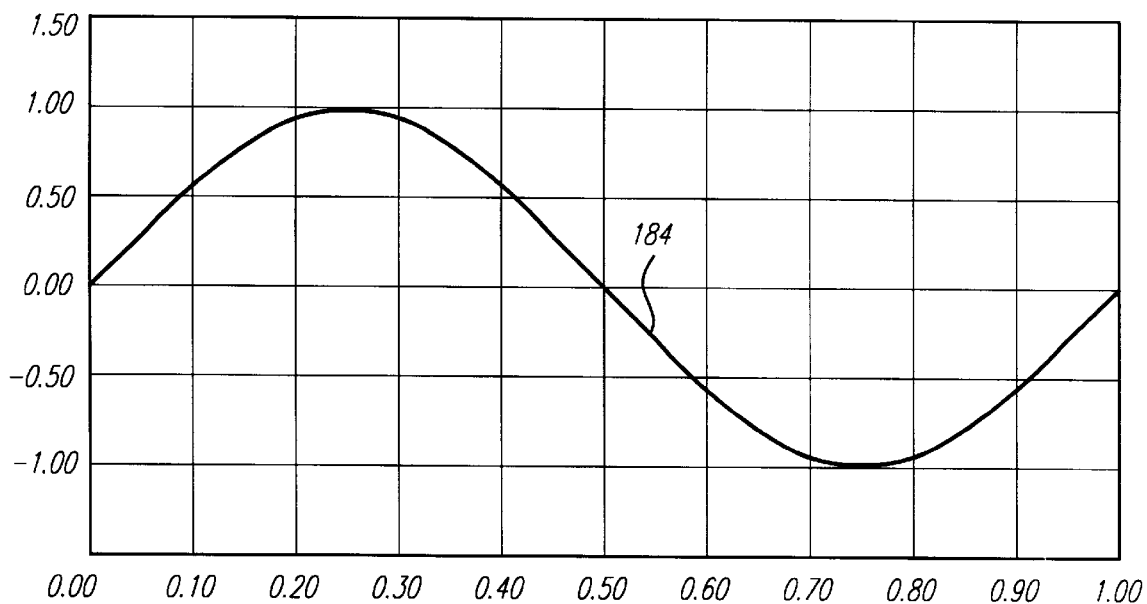
FIG. 33 shows a carrier segment having the form of one sine cycle for use with one symbol.
Figure 34:
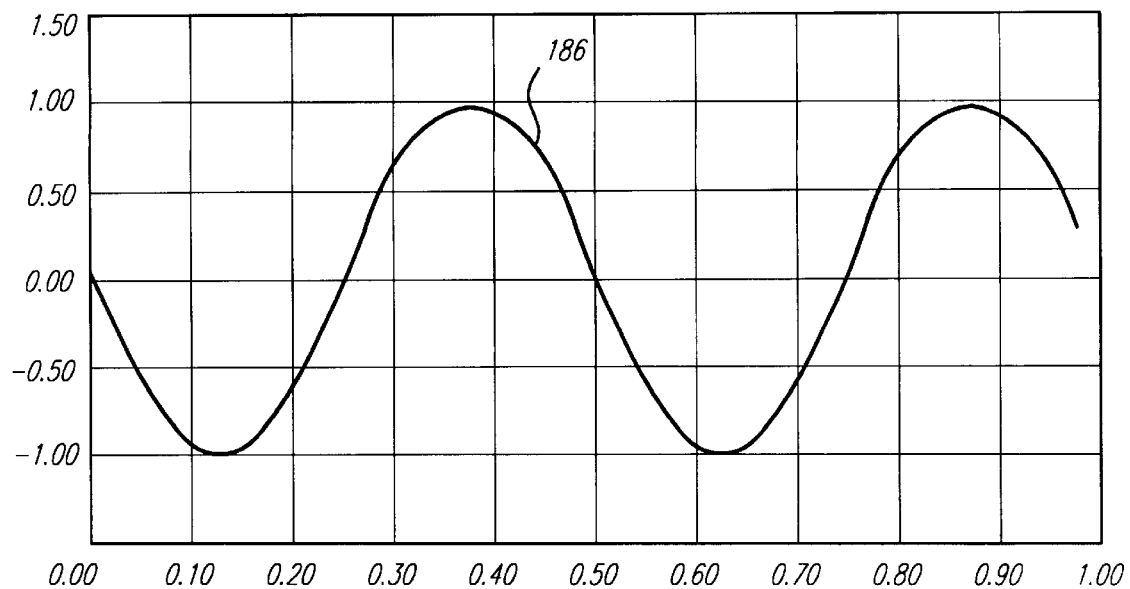
FIG. 34 shows a carrier segment which is orthogonal to the carrier segment shown in FIG. 33 and has the form of a group of two sine cycles for use with one symbol.
Figure 35:
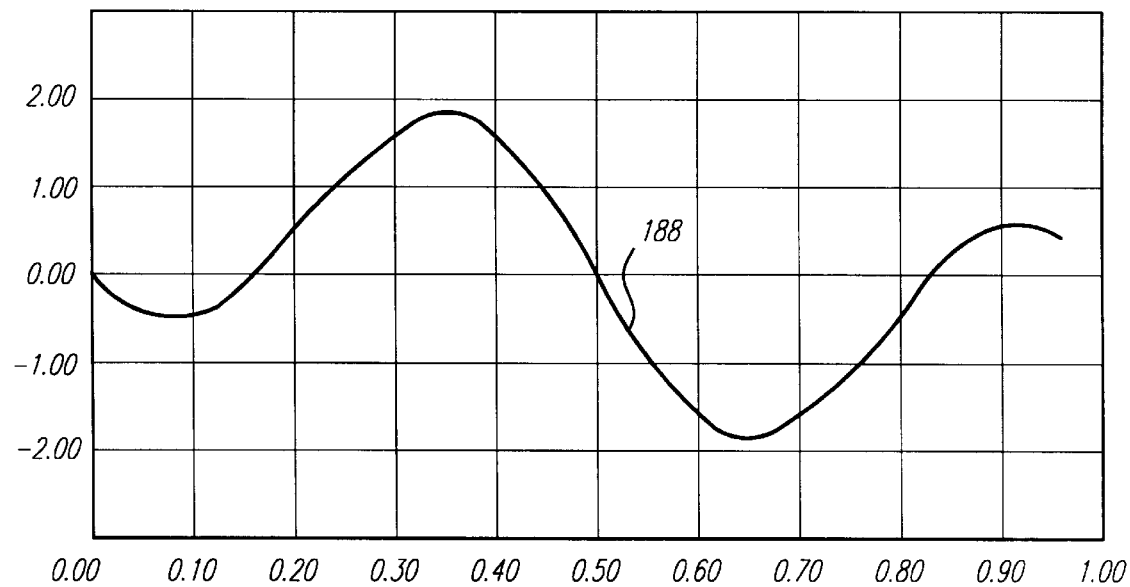
FIG. 35 shows a dual orthogonal frequency carrier summation of the sine cycle shown in FIG. 33 and the two sine cycles shown in FIG. 34.

FIG. 30 shows a carrier segment 178 having the form of one cosine cycle for use with one symbol. FIG. 31 shows a carrier segment 180 which is orthogonal to the carrier segment 178 shown in FIG. 30 and has the form of a group of two cosine cycles for use with one symbol. FIG. 32 shows a dual orthogonal frequency carrier summation 182 of the cosine cycle 178 shown in FIG. 30 and the two cosine cycles 180 shown in FIG. 31. FIG. 33 shows a carrier segment 184 having the form of one sine cycle for use with one symbol. FIG. 34 shows a carrier segment 186 which is orthogonal to the carrier segment 184 shown in FIG. 33 and has the form of a group of two sine cycles for use with one symbol. FIG. 35 shows a dual orthogonal frequency carrier summation 188 of the sine cycle 184 shown in FIG. 33 and the two sine cycles 186 shown in FIG. 34.

Figure 36:
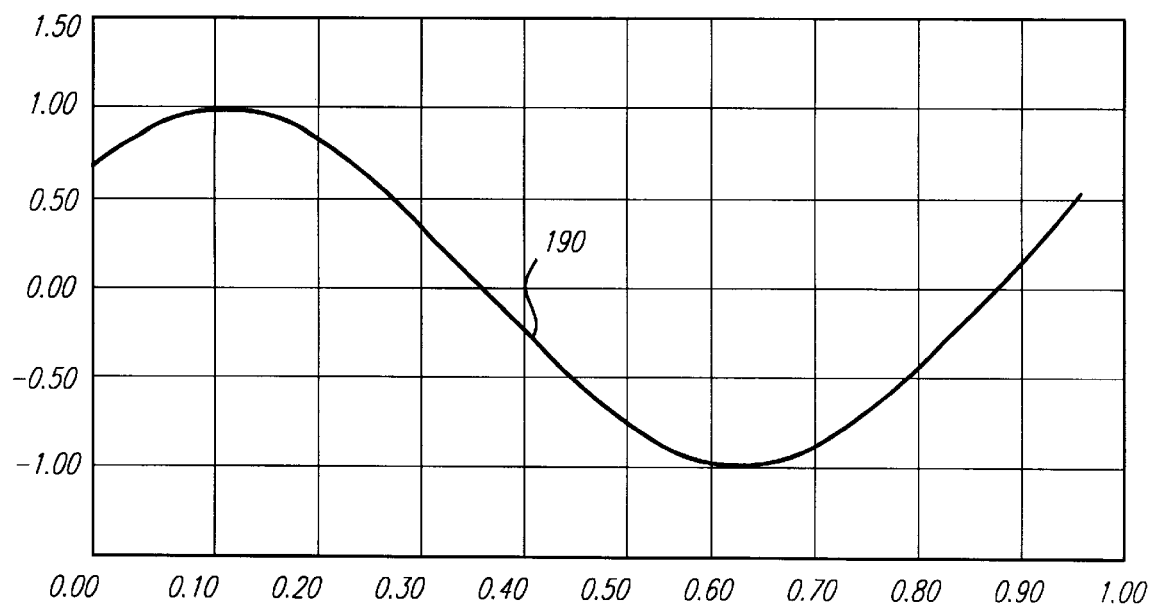
FIG. 36 shows a carrier segment having the form of one time-shifted sine cycle for use with one symbol.
Figure 37:
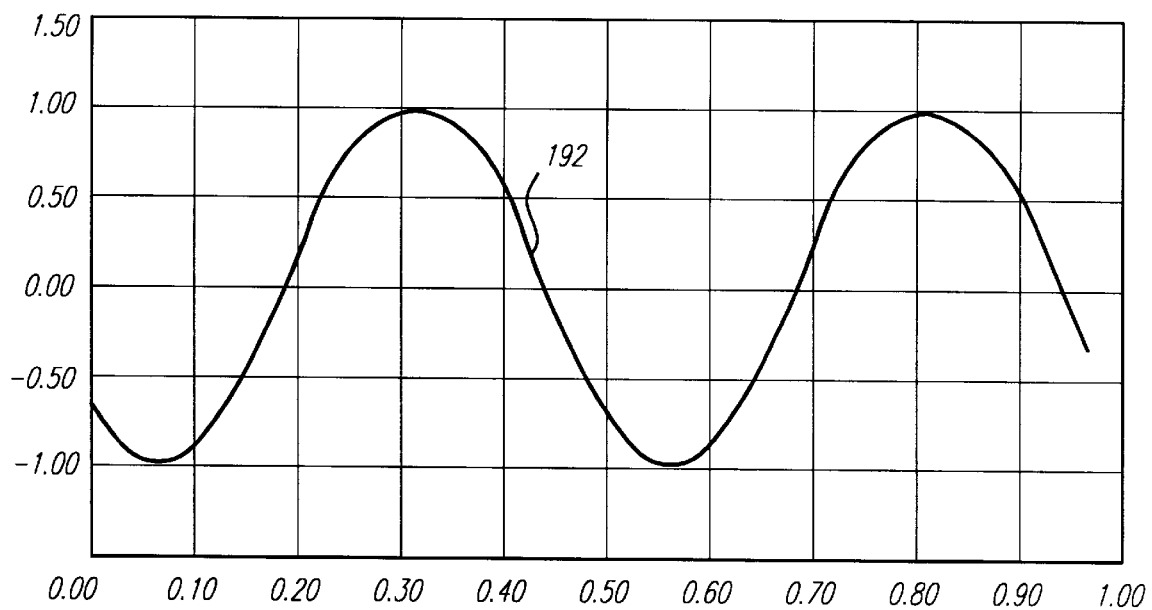
FIG. 37 shows a carrier segment which is orthogonal to the carrier segment shown in FIG. 36 and has the form of a group of two time-shifted sine cycles for use with one symbol.
Figure 38:
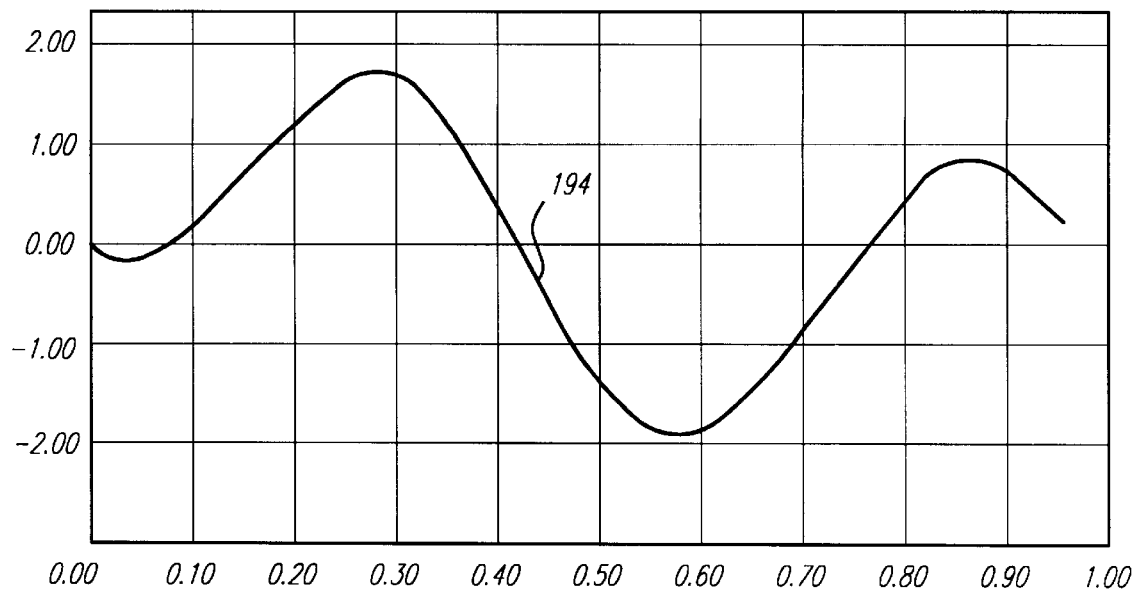
FIG. 38 shows a dual orthogonal frequency carrier summation of the time-shifted sine cycle shown in FIG. 36 and the two time-shifted sine cycles shown in FIG. 37.
Figure 39:
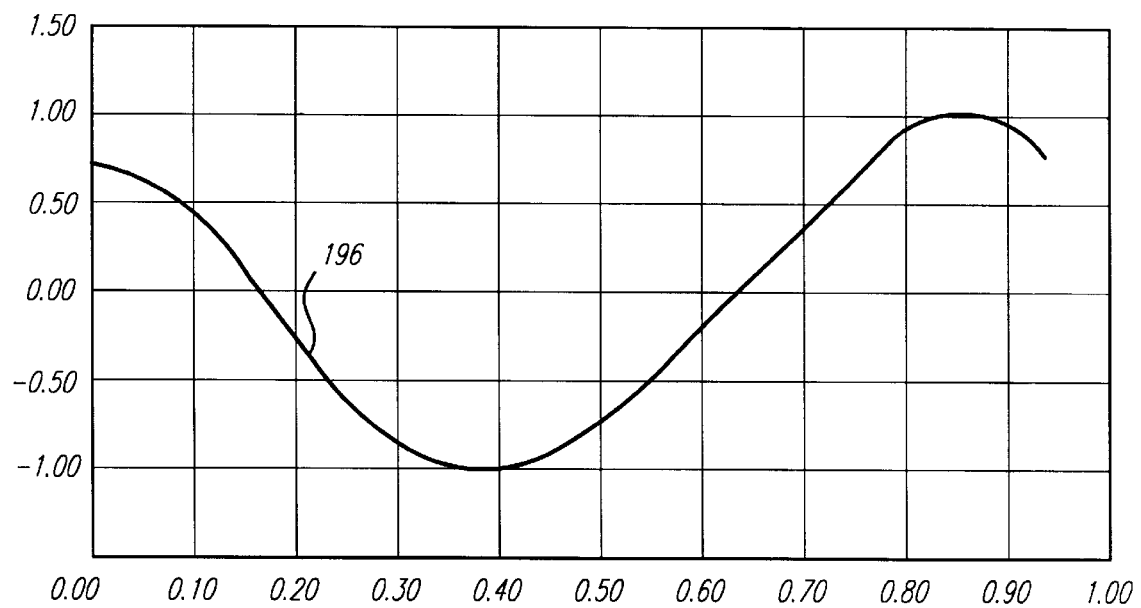
FIG. 39 shows a carrier segment having the form of one time-shifted cosine cycle for use with one symbol.
Figure 40:
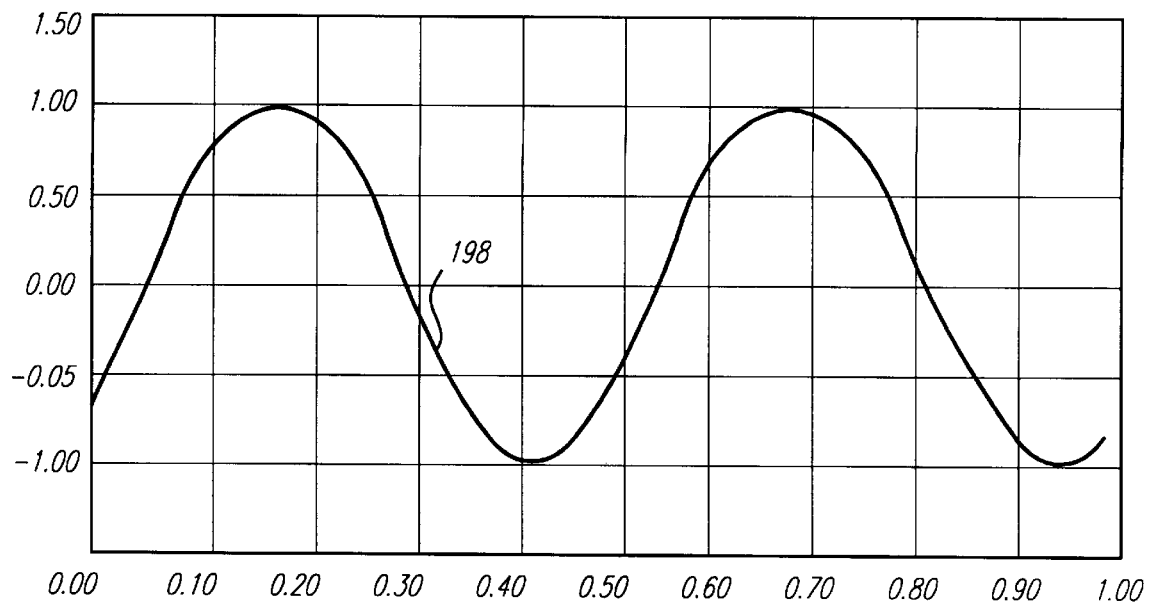
FIG. 40 shows a carrier segment which is orthogonal to the carrier segment shown in FIG. 39 and has the form of a group of two time-shifted cosine cycles for use with one symbol.
Figure 41:
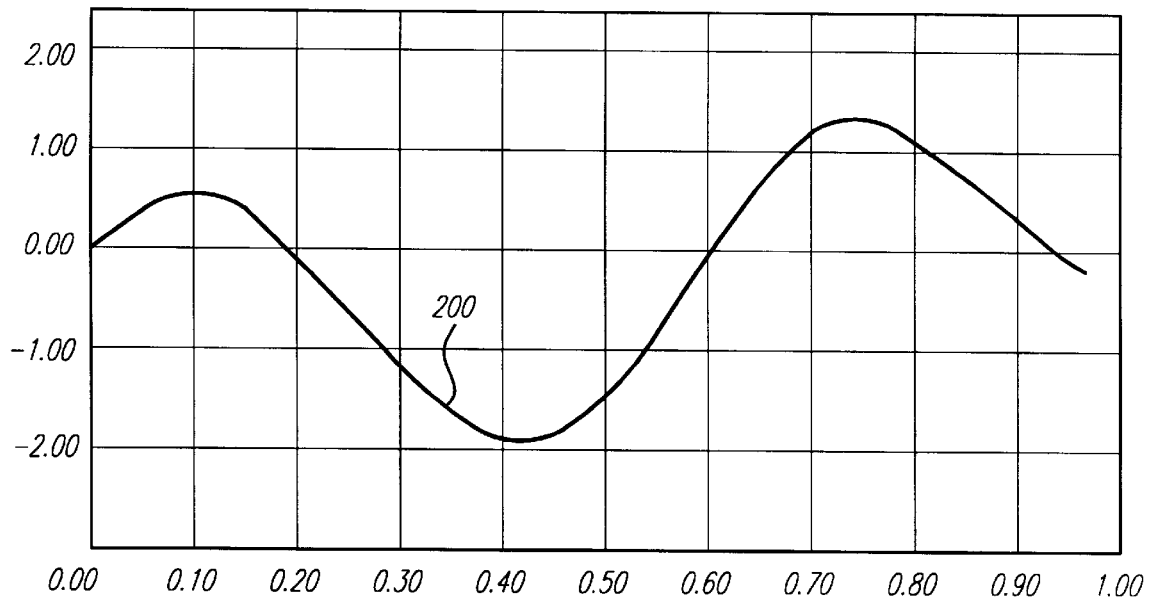
FIG. 41 shows a dual orthogonal frequency summation of the time-shifted cosine cycle shown in FIG. 39 and the two time-shifted cosine cycles shown in FIG. 40.

FIG. 36 shows a carrier segment 190 having the form of one time-shifted sine cycle for use with one symbol. FIG. 37 shows a carrier segment 192 which is orthogonal to the carrier segment 190 shown in FIG. 36 and has the form of a group of two time-shifted sine cycles for use with one symbol. FIG. 38 shows a dual orthogonal frequency carrier summation 194 of the time-shifted sine cycle 192 shown in FIG. 36 and the two time-shifted sine cycles 194 shown in FIG. 37. FIG. 39 shows a carrier segment 196 having the form of one time-shifted cosine cycle for use with one symbol. FIG. 40 shows a carrier segment 198 which is orthogonal to the carrier segment 196 shown in FIG. 39 and has the form of a group of two time-shifted cosine cycles for use with one symbol. FIG. 41 shows a dual orthogonal frequency summation 200 of the time-shifted cosine cycle 196 shown in FIG. 39 and the two time-shifted cosine cycles 198 shown in FIG. 40.

The symbols described include a single sine or cosine cycle (a single frequency) and a dual sine or cosine cycle (another single frequency), both having the same time duration. Using the single and dual cycles provides the optimum method for transmitting data over wire links that may be impaired by impedance discontinuities. When transmitting by coaxial cable or by radio, multiple cycles per symbol may be used with the attendant advantage that the resultant signal envelope will exhibit nulls. As long as the number of cycles in the "one" symbol and the number of cycles in the "zero" symbol add up to an integer number, the envelope will exhibit nulls at the transition from one symbol to another, thus providing a ready source of bit-clock synchronization. The nulls occur between symbols, thereby providing a smooth transition between the symbols. For a given bit rate, using the single cosine cycle and the dual cosine cycles as symbols (a difference of one cycle) yields a signal whose bandwidth is the same as using any number of cosine cycles as symbols, as long as the symbols differ by one cycle. The difference is that the spectral bandwidth, while the same width, will be shifted to a higher frequency proportional to the number of cycles in the symbols.

As an example of creating frequency-diversity symbols, if a group of five cosine cycles is available for use as one symbol (as shown in FIG. 24) and a group of six cosine symbols is available for use as the other symbol (as shown in FIG. 25), they may be summed creating a new symbol (as shown in FIG. 26). Inverting the first symbol creates a second symbol. This process creates two frequency-diversity symbols. If a six sine cycle group (as shown in FIG. 27) and a five sine cycle group (as shown in FIG. 28) are available for summing, an additional two frequency diversity symbols may be had (FIG. 29 and its inverse).

This process is not limited to the sine and cosine signals Additional cycle groups with smaller angular displacements may be used to yield greater numbers of symbols. Each resultant symbol will contain both frequency elements, and, as a result, will double the voltage difference between peaks and nulls, increasing the ease of clock recovery by 3 dB. The prior discussion has covered the creation of multiple symbols by the use of various numbers of cycles at various relative angular shifts. Additional symbols may be had by amplitude modulating the symbols whose generation has just been discussed. Again, as discussed before, the thresholds determining the various amplitude states would be extrapolated from the amplitude of the training sequence. Once set during the training sequence, the thresholds would be held for the duration of the data transmission. At the end of the data transmission the template storage and comparison unit undergoes a time-out reset, thus enabling it to be trained on the next burst transmission.

Figure 43:
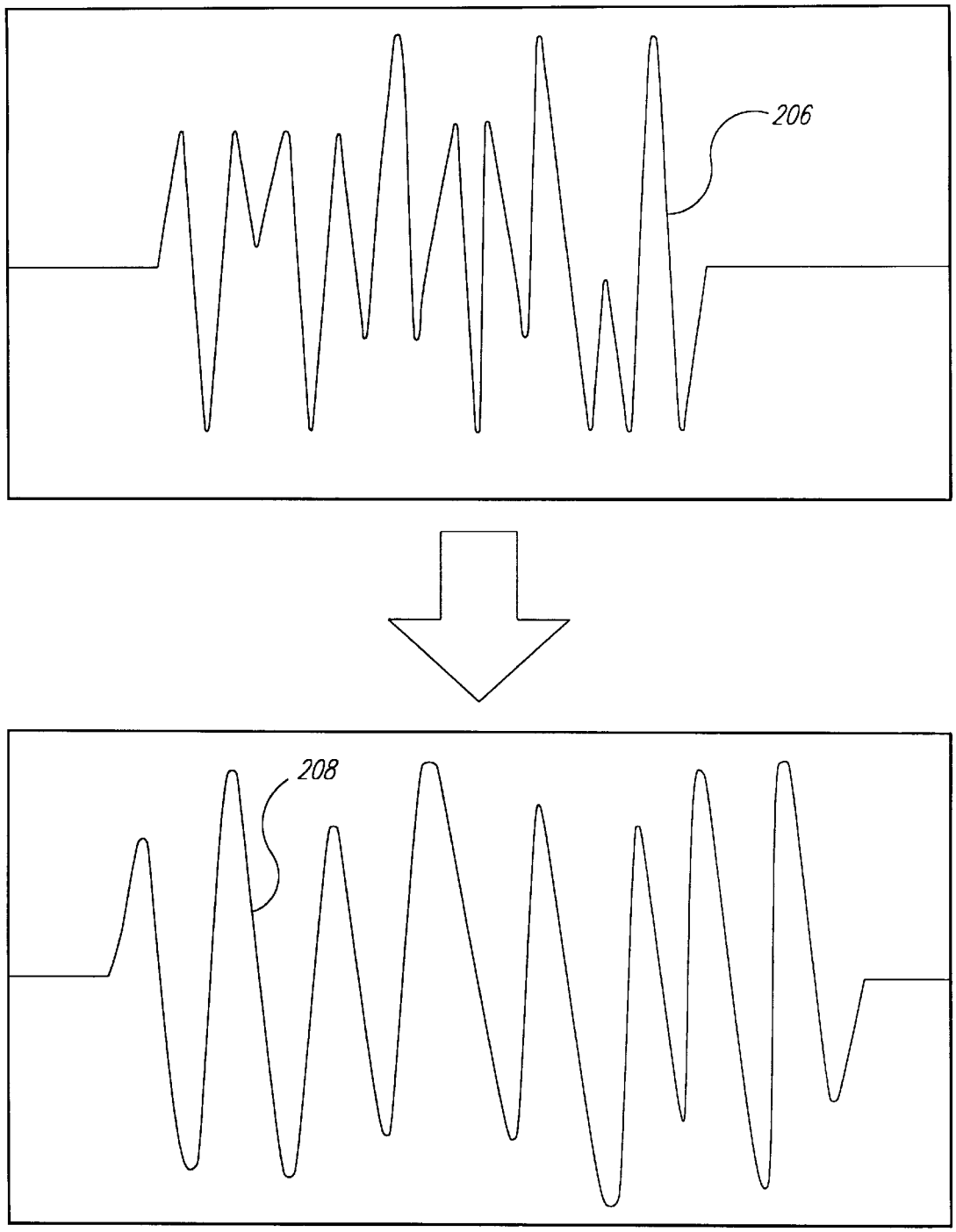
FIG. 43 shows a dual orthogonal frequency carrier digital signal transmission and a dual orthogonal frequency carrier digital signal reception based on a summation of the main transmitted signal with reflected signals that result in non-destructive impairment of the received signal according to the present invention.

FIGS. 42 and 43 demonstrate the difference between single carrier digital signal transmission and reception according to the prior art and the dual orthogonal frequency carrier digital signal transmission and reception according to the present inventions FIG. 42 shows a single carrier digital signal transmission 202 and a single carrier digital signal reception 204 based on a summation of the main transmitted signal with reflected signals that result in the destructive impairment of the received signal according to the prior art. FIG. 43 shows a dual orthogonal frequency carrier digital signal transmission 206 and a dual orthogonal frequency carrier digital signal reception 208 based on a summation of the main transmitted signal with reflected signals that result in non-destructive impairment of the received signal according to the present invention.

It is to be understood that the present invention is not limited to the embodiments described above, but encompasses any and all embodiments within the scope of the following claims.

I claim:

1. A method of modulating using a plurality of digital data blocks as carrier segments of a carrier, the method of modulating comprising the steps:

creating a table of amplitude coefficients representing predetermined shapes, each of said predetermined shapes beginning and ending with zero slope edges;

storing the table of amplitude coefficients in a read only memory look-up table;

sequentially receiving the plurality of digital data blocks, wherein each of the plurality of digital data blocks has a predetermined discrete value associated therewith out of a predetermined number of possibly assigned discrete values;

creating modulated carrier segments using each of the plurality of digital data blocks;

accessing a succession of address locations in the read only look-up table for stored amplitude coefficients corresponding to said predetermined shapes for each of the plurality of digital data blocks;

retrieving an equal number of successive stored amplitude coefficients from the read only memory look-up table that correspond to said predetermined shapes for each of the plurality of digital data blocks; and directing the equal number of successive stored amplitude coefficients corresponding to said predetermined shapes to a digital-to-analog converter to produce a carrier waveform.

2. A method of modulating a plurality of digital data blocks as carrier segments of a carrier according to claim 1, further comprising the step of using a finite impulse response filter.

3. A method of modulating a plurality of digital data blocks as carrier segments of a carrier according to claim 1, wherein said step of sequentially receiving further comprises the step of initially receiving carrier segments and special symbols designed to provide symbol edge synchronization that can be used for a long series of data symbols to follow.

4. A method of modulating a plurality of digital data blocks as carrier segments of a carrier according to claim 3, wherein said step of sequentially receiving further comprises the step of using amplitudes of said special symbols as a standard from which voltage thresholds are derived.

5. A method of modulating a plurality of digital data blocks as carrier segments of-a carrier according to claim 1, wherein said step of sequentially receiving utilizes a digital logic controller and further comprises the step of determining the content of each of the plurality of digital data blocks.

6. A method of modulating a plurality of digital data blocks as carrier segments of a carrier according to claim 5, further comprising the step:

sending a signal from the digital logic controller to a phase accumulator indicative of a symbol to be transmitted;

determining successive address locations in the read only memory look-up table for stored amplitude coefficients corresponding to the symbol to be transmitted, and retrieving successive stored amplitude coefficients corresponding to the symbol to be transmitted from the read only memory look-up table.

7. A method of modulating a plurality of digital data blocks as carrier segments of a carrier according to claim 6, wherein said step of sending a signal further comprises the steps:

informing the phase accumulator how many address locations to use for each symbol to be transmitted.

8. A method of modulating a plurality of digital data blocks as carrier segments of a carrier according to claim 6, further comprising the step of filtering the carrier waveform produced by said digital-to-analog converter in order to produce a low distortion carrier waveform.

9. A method of modulating using a plurality of digital data blocks as carrier segments of a dual orthogonal frequency carrier, the method of modulating comprising the steps;

creating a table of amplitude coefficients representing predetermined shapes containing dual orthogonal frequency carrier segments;

storing the table of amplitude coefficients in a read only memory look-up table;

sequentially receiving the plurality of digital data blocks, wherein each of the plurality of digital data blocks has a predetermined discrete value associated therewith out of a predetermined number of possibly assigned discrete values;

creating modulated carrier segments using each of the plurality of digital data blocks representing two orthogonal frequency carriers;

accessing a succession of address locations in the read only memory look-up table for stored amplitude coefficients corresponding to said predetermined shapes for each of the plurality of digital data blocks;

retrieving an equal number of successive stored amplitude coefficients from the read only memory look-up table that correspond to said predetermined shapes for each of the plurality of digital data blocks; and directing the equal number of successive stored amplitude coefficients corresponding to said predetermined shapes to a digital-to-analog converter to produce a dual orthogonal frequency carrier waveform.

10. A method of modulating a plurality of digital data blocks as carrier segments of a dual orthogonal frequency carrier according to claim 9, further comprising the step of using a finite impulse response filter.

11. A method of modulating a plurality of digital data blocks as carrier segments of a dual orthogonal frequency carrier according to claim 9, wherein said step of sequentially receiving further comprises the step of initially receiving carrier segments and special symbols designed to provide symbol edge synchronization that can be used for a long series of data symbols to follow.

12. A method of modulating a plurality of digital data blocks as carrier segments of a dual orthogonal frequency carrier according to claim 11, wherein said step of sequentially receiving further comprises the step of using amplitudes of said special symbols as a standard from which voltage thresholds are derived.

13. A method of modulating a plurality of digital data blocks as carrier segments of a dual orthogonal frequency carrier according to claim 9, wherein said step of sequentially receiving utilizes a digital logic controller, and further comprises the step of determining the content of each of the plurality of digital data blocks.

14. A method of modulating a plurality of digital data blocks as carrier segments of a dual orthogonal frequency carrier according to claim 13, further comprising the step:

sending a signal from the digital logic controller to a phase accumulator indicative of a symbol to be transmitted;

determining successive address locations in the read only memory look-up table for stored amplitude coefficients corresponding to the symbol to be transmitted, and retrieving successive stored amplitude coefficients corresponding to the symbol to be transmitted from the read only memory look-up table.

15. A method of modulating a plurality of digital data blocks as carrier segments of a dual orthogonal frequency carrier according to claim 14, wherein said step of sending a signal further comprises the steps:

informing the phase accumulator how many address locations to use for each symbol to be transmitted.

16. A method of modulating a plurality of digital data blocks as carrier segments of a dual orthogonal frequency carrier according to claim 14, further comprising the step of filtering the carrier waveform produced by said digital-to-analog converter in order to produce a low distortion carrier waveform.

17. A method of digital carrier segment demodulation comprising the steps:

receiving digital carrier segment modulated data in a communication channel, the digital carrier segment modulated data comprising a plurality of carrier segments and a header of preamble carrier segments that defines a pattern for each digital state, wherein each of the carrier segments begins and ends with zero kinetic energy;

filtering the digital carrier segment modulated data;

digitally sampling and storing the received header as an adaptive template thus taking into consideration degradation that occurs in the communication channel for evaluating the digital carrier segment modulated data; and recovering data from the plurality of carrier segments of the digital carrier segment modulated data by using the adaptive template for evaluating the digital carrier segment modulated data.

18. A method of digital demodulation as recited in claim 17, wherein said step of receiving includes subsequently receiving carrier segments which have associated digital values that are compared against the stored templates to determine how many digital values match the stored template values.

19. A method of digital carrier segment demodulation according to claim 18, further comprising the step of determining decision as to which carrier segment is received according to the template with the highest number of matches for each subsequently received carrier segment and using carrier segment amplitude values compared against stored voltage threshold values.

20. A method digital demodulation as recited in claim 18, further comprising the step of constantly updating the templates for each data burst or portion of a burst.

21. A method of digital demodulation as recited in claim 17, wherein said step of recovering is performed by detecting the presence of a carrier segment within a predetermined bit time.

22. A method of digital demodulation as recited in claim 17, wherein said step of recovering is performed by detecting the presence of a sine or cosine segment within a predetermined carrier segment duration.

23. A carrier segment communications system comprising:

means for sequentially receiving a plurality of digital data blocks, each of said digital data blocks having a predetermined discrete value associated therewith, said predetermined discrete value being chosen from a predetermined number of possibly assigned discrete values;

means for modulating said plurality of digital data blocks in order to construct a carrier signal having a plurality of carrier segments representing a predetermined set of shapes, said means for modulating including an input and an output;

means for determining completion of each of the plurality is of carrier segments of the carrier signal constructed by said means for modulating, said means for determining being coupled to the output of said means for modulating; and a controller for producing a control signal indicative of a predetermined shape to be selected in accordance with a predetermined discrete value associated with said plurality of digital data blocks, said controller further including:

a first input coupled to said means for sequentially receiving;

a second input coupled to said means for determining; and an output coupled to the input of said means for modulating.

24. A carrier segment communications system as recited in claim 23, wherein said means for sequentially receiving further includes means for determining initial carrier segments and special symbols designed to provide bit edge synchronization that can be used for a long series of data symbols to follow.

25. A carrier segment communications system as recited in claim 23, wherein said means for sequentially receiving further includes means for using amplitudes of said special symbols as a standard from which voltage thresholds are derived.

26. A cosine segment communications system as recited in claim 23, wherein said means for sequentially receiving further includes means for initially receiving a sequence of preamble symbols which are digitally sampled and stored for use as templates uniquely defining the pattern for each digital state.

27. A carrier segment communications system as recited in claim 26, wherein said means for sequentially receiving further includes means for subsequently receiving symbols that have associated digital values that are compared against the stored templates to determine how many digital values match the stored template values.

28. A carrier segment communications system as recited in claim 27, wherein said means for sequentially receiving further comprises means for determining a decision as to which symbol is received according to the template with the highest number of matches for each subsequently received symbol and using symbol amplitude values compared against stored voltage threshold values.

29. A carrier segment communications system as recited in claim 27, wherein said means for sequentially receiving further comprises means for constantly updating the templates for each data burst or portion of a burst.

30. A carrier segment communications system as recited in claim 23 further comprising:

means for transmitting said carrier signal to a remote destination;

means for remotely receiving said carrier signal; and means for demodulating said carrier signal.

31. A carrier segment communications system as recited in claim 23 wherein said means for modulating further comprises:

a phase accumulator coupled to the output of said controller for receiving said control signal and generating a succession of phase address locations in accordance with said control signal; and a read only memory look-up table having carrier segment coefficients stored therein in a successive manner corresponding to said phase address locations, thereby producing a succession of carrier segment coefficients.

32. A carrier segment communications system as recited in claim 23 wherein said means for modulating further includes:
- a digital-to-analog converter coupled to said read only memory look-up table, said digital-to-analog converter being capable of converting said succession of carrier segment coefficients into analog signals; and
- a filter capable of receiving said analog signals from said digital-to-analog converter and producing a low distortion sinusoidal waveform.

33. A carrier segment communications system as recited in claim 23 wherein said means for demodulating includes:
- a first filter for removing unwanted noise and interference from the carrier signal transmitted to said means for receiving;
- a first oscillator having a predetermined frequency corresponding to a frequency of one of said carrier segments;
- a mixer having a first and second input for respectfully mixing signals from said first filter and said first oscillator, and an output for directing a resultant signal;
- a second filter coupled to the output of said mixer for removing unwanted noise and interference from the resultant signal; and
- means for recovering a carrier segment from said resultant signal.

34. A carrier segment communication system as recited in claim 33, wherein said first filter includes a predetermined number of outputs corresponding to said predetermined number of discrete values and said means for modulating further comprises:
- a second oscillator having a predetermined frequency corresponding to the frequency of another one of said segments;
- a second mixer having a first and second input for respectively receiving the signals from said first filter and said second oscillator, and an output for directing the resultant signal;
- a third filter coupled to the output of said second oscillator for removing noise from the resultant signal;
- a first peak detector coupled to the output of said second filter;
- a second peak detector coupled to the output of said third filter;
- a first carrier segment energy detector coupled to the output of said first peak detector;
- a second carrier segment energy detector coupled to the output of said second peak detector; and
- a comparator having two inputs and an output, each of said inputs being respectively coupled to said first and second carrier segment energy detectors.

35. A carrier segment communication system as recited in claim 34 wherein said peak detectors each include:
- an operational amplifier having its inverted input coupled to said filter; and
- a delay circuit having an input coupled to said filter, and an output coupled to the normal input of said operational amplifier.

* * * * *